US007965666B2

(12) United States Patent
Aoki

(10) Patent No.: US 7,965,666 B2
(45) Date of Patent: Jun. 21, 2011

(54) COMMUNICATION SYSTEM, CHILD SYSTEM AND CONTROL METHOD THEREOF, AND STORAGE MEDIUM

(75) Inventor: Norihito Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 12/019,177

(22) Filed: Jan. 24, 2008

(65) Prior Publication Data
US 2008/0181157 A1 Jul. 31, 2008

(30) Foreign Application Priority Data
Jan. 26, 2007 (JP) ................................. 2007-017009

(51) Int. Cl.
G08C 17/00 (2006.01)
H04Q 7/00 (2006.01)
H04B 7/212 (2006.01)
H04J 3/16 (2006.01)

(52) U.S. Cl. ........ 370/311; 370/329; 370/337; 370/348; 370/468; 455/343.4

(58) Field of Classification Search ........................ None
See application file for complete search history.

(56) References Cited

U.S. PATENT DOCUMENTS
6,463,307 B1 10/2002 Larson et al.
2003/0152059 A1* 8/2003 Odman ........................ 370/338
2004/0038707 A1* 2/2004 Kim ............................ 455/554.1
2008/0130540 A1* 6/2008 Singh et al. .................... 370/311
2009/0040954 A1* 2/2009 Usuba .......................... 370/311

FOREIGN PATENT DOCUMENTS
JP 06-141365 5/1994
JP 2003-517741 5/2003

OTHER PUBLICATIONS

IEEE Std 802.15.3™-2003 Part 15.3: Wireless Medium Access Control (MAC) and Physical Layer (PHY) Specification for High Rate Wireless Personal Area Networks (WPANs).
Specification of the Bluetooth System wireless connections made easy Dec. 1, 1999 vol. 1 and vol. 2.

* cited by examiner

Primary Examiner — Seema S Rao
Assistant Examiner — Christine Duong
(74) Attorney, Agent, or Firm — Cowan, Liebowitz & Latman, P.C.

(57) ABSTRACT

A communication system comprises a control station and a child station. The child station decides a communication period between the child station and the control station in order to maintain a connection state in a power save mode. The decision of the communication period is performed in accordance with a predetermined wake-up period, a time-out value that maintains the connection state even when no communication is taking place, and a frame length that is a unit of the communication. The child station decides on the time-out value to be the communication period when the wake-up period is greater than the time-out period, and decides on the wake-up period to be the communication period when the wake-up period is less than or equal to the time-out period. The child station then transmits the decided communication period to the control station.

6 Claims, 27 Drawing Sheets

FIG. 5

| bits : b15-b11 | b10 | b9 | b8-b7 | b6 | b5-b3 | b2-b0 |
|---|---|---|---|---|---|---|
| Reserved | More Data | Retry | ACK Policy | SEC | Frame Type | Protocol Version |
| 507 | 506 | 505 | 504 | 503 | 502 | 501 |

Frame Control Field Format

410

Non secure MAC Frame Body Format

Non-secure Beacon Frame Format

PNC Response Field

Information Element

Non-secure Command Frame Format

F I G. 13
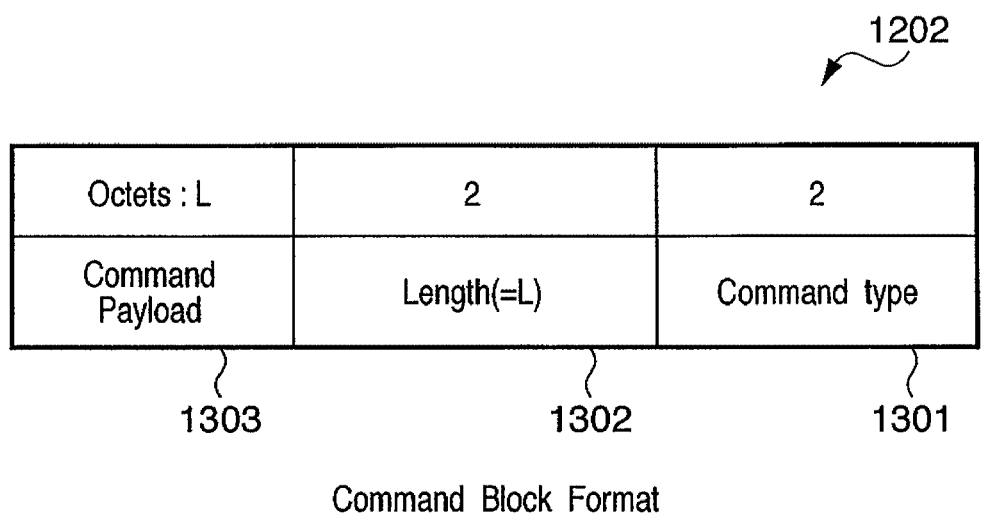
Command Block Format

F I G. 19
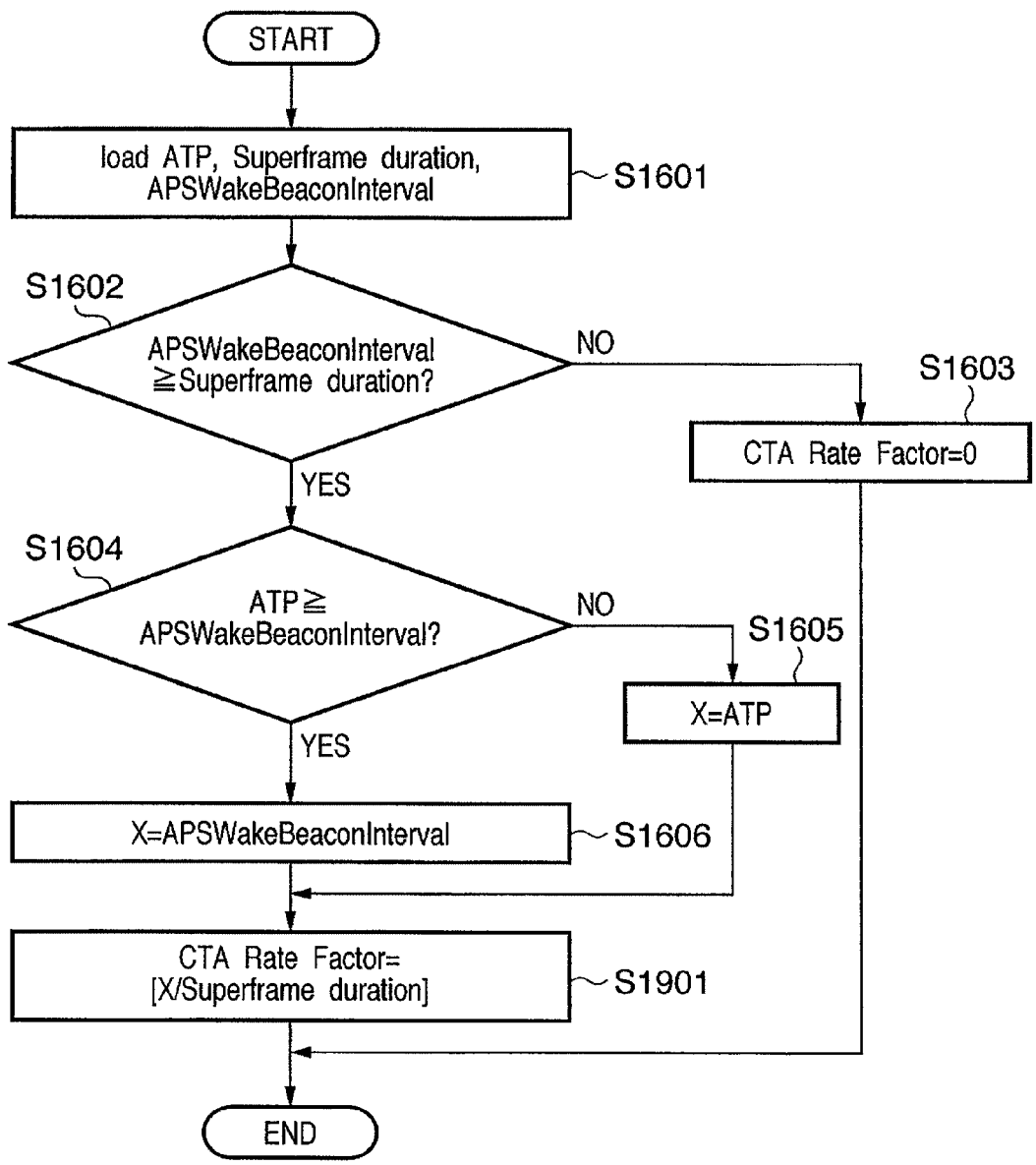

Set MCTA Rate Factor with Vendor Specific Commands MSC

FIG. 24

Valid Frame Type Values

| Type Value b5b4b3 | Frame Type Description |
|---|---|
| 000 | Beacon Frame |
| 001 | Immediate ACK (Imm-ACK) Frame |
| 010 | Delayed ACK (Imm-ACK) Frame |
| 011 | Command Frame |
| 100 | Data Frame |
| 101-111 | Reserved |

FIG. 25

Valid ACK Policy Field Type Values

| Type Value b8b7 | ACK Policy Type |
|---|---|
| 00 | No ACK |
| 01 | Immediate ACK (Imm-ACK) |
| 10 | Delayed ACK (Imm-ACK) |
| 11 | Dly-ACK Request |

FIG. 26

Information elements

| Element ID Value | Element |
| --- | --- |
| 0x00 | Channel Time Allocation |
| 0x01 | BSID |
| 0x02 | Parent Piconet |
| 0x03 | DEV Association |
| 0x04 | PNC Shutdown |
| 0x05 | Piconet Parameter Change |
| 0x06 | Application Specific |
| 0x07 | Pending Channel Time Map (PCTM) |
| 0x08 | PNC Handover |
| 0x09 | CTA Status |
| 0x0A | Capability |
| 0x0B | Transmit Power Parameter |
| 0x0C | PS Status |
| 0x0D | Continued Wake Beacon (CWB) |
| 0x0E | Overlapping PNID |
| 0x0F | Piconet Services |
| 0x10-0x7F | Reserved |
| 0x80-0xFF | Vendor Specific |

FIG. 27  Command types

| Command type hex value b15-b0 | Command name |
|---|---|
| 0x0000 | Association request |
| 0x0001 | Association response |
| 0x0002 | Disassociation request |
| 0x0003 | Request key |
| 0x0004 | Request key response |
| 0x0005 | Distribute key request |
| 0x0006 | Distribute key response |
| 0x0007 | PNC handover request |
| 0x0008 | PNC handover response |
| 0x0009 | PNC handover information |
| 0x000A | PNC information request |
| 0x000B | PNC information |
| 0x000C | Security information request |
| 0x000D | Security information |
| 0x000E | Probe request |
| 0x000F | Probe response |
| 0x0010 | Piconet services |
| 0x0011 | Announce |
| 0x0012 | Channel time request |
| 0x0013 | Channel time response |
| 0x0014 | Channel status request |
| 0x0015 | Channel status response |
| 0x0016 | Remote scan request |
| 0x0017 | Remote scan response |
| 0x0018 | Transmit power change |
| 0x0019 | PS set information request |
| 0x001A | PS set information response |
| 0x001B | SPS configuration request |
| 0x001C | SPS configuration response |
| 0x001D | PM mode change |
| 0x001E | Security message |
| 0x001D-0x00FF | Reserved |
| 0x0100-0xFFFF | Vendor Specific |

COMMUNICATION SYSTEM, CHILD STATION AND CONTROL METHOD THEREOF, AND STORAGE MEDIUM

BACKGROUND OF THE INVENTION

1. Field of the Invention

The present invention relates to a communication system, a child station and a control method thereof, and a storage medium.

2. Description of the Related Art

A variety of wireless communication protocols are defined with regard to a wireless communication system that performs a Time Division Multiple Access connection communication that forms a wireless network; for example, IEEE Std. 802.15.3-2003, or Bluetooth Specification Version 1.0B. When transitioning to a power save mode, a child station informs a control station that the child station itself is in the power save mode, and the control station, upon receiving a request from the child station, changes access timing from the child station.

For example, there are four power management modes under the IEEE Std. 802.15.3, as follows:
Active;
Asynchronous Power Save (APS);
Device Synchronous Power Save (DSPS); and
Piconet Synchronous Power Save (PSPS).

The three modes other than "ACTIVE" are energy conservation modes.

Under the APS mode of the IEEE 802.15.3 specification, a DEV, that is, a child station terminal device, maintains a communications state by accessing a PNC, that is, a control station terminal device, at an arbitrary time within an ATP interval. ATP stands for "Association Timeout Period," which is a time period, that is, a time-out value, wherein an association, that is, a connection state, is sustained when a signal is not received from a communication participant. When the signal is not received from the communication participant, the association is maintained until a time interval wherein the signal is not received exceeds the ATP, whereupon the association is terminated. A frame for maintaining the communication state between the DEV and the PNC under the present specification is a Contention Access Period (CAP) or a Channel Time Allocation (CTA) that is addressed to the channel.

The CAP uses a Carrier Sense Multiple Access with Collision Avoidance (CSMA/CA) protocol. Accordingly, when the DEV fails to access the PNC because it conflicts with another DEV in attempting to access the PNC, it is necessary for the DEV to retry until it succeeds in access the PNC.

When using the CAP, it is necessary for the DEV to analyze a beacon frame and acquire access timing for the CTA that is addressed to the channel. Consequently, when the CTA that is addressed to the channel is not present within the frame thus received, the DEV must persist in the operation of receiving and analyzing the beacon frame until the DEV finds the CTA that is addressed to the channel.

In such a circumstance, a problem arises wherein a power consumption of the DEV increases significantly. Japanese Patent Laid Open No. 2003-517741 discloses a system that specifies a frequency whereby a mobile terminal device that suspends an operation and transitions to the power save mode when a period that a base station specifies ends listens for a call message from the base station.

The configuration recited by Japanese Patent Laid Open No. 2003-517741 presumes the frequency of listening for the call message from the base station to be an integer multiple of a superframe. A specification such as the IEEE 802.11 wireless LAN (Wi-Fi) standard does not set forth a time-out of the Association Timeout Period, and thus, it is possible to set the frequency not to time out. With a system such as the IEEE Std. 802.15.3, however, which does have a time-out for the Association Timeout Period between the PNC and the DEV, it is not possible to set an arbitrary value of the frequency of listening for the call message from the base station.

Consequently, with a conventional configuration the DEV is not capable of performing a communication at a desired timing, there is a limit to how much the time required by the DEV to wake-up may be reduced, and, accordingly, it is not possible to adequately lower the power consumption of the DEV. An instance may also arise whereby access timing is set that is unnecessary for the PNC, resulting in a limit to improving a throughput of the communication system.

SUMMARY OF THE INVENTION

The present invention was devised with the preceding problems in mind, and provides a technology that is capable of reducing the power consumption of the apparatus.

According to one aspect of the present invention, a communication system comprises a control station and a child station, the child station comprises:

a decision device adapted to decide a communication period between the child station and the control station, which is performed in order to maintain a connection state between the child station and the control station in a power save mode, the decision of the communication period being performed in accordance with a predetermined wake-up period, a time-out value that maintains the connection state between the child station and the control station even when no communication is taking place, and a frame length that is a unit of the communication between the control station and the child station; and a transmission device adapted to transmit the communication period that is decided upon by the decision device to the control station;

wherein the decision device decides on the time-out value to be the communication period when the wake-up period is greater than the time-out period, and decides on the wake-up period to be the communication period when the wake-up period is less than or equal to the time-out period, the control station comprises:

an assignment device adapted to assign an interval for communicating with the child station, in accordance with the communication period that is received from the child station; and a notification device adapted to notify the child station of the interval that is assigned by the assignment device.

According to another aspect of the present invention, a child station of a communication system comprises a control station and a child station, the child station comprises:

a decision device adapted to decide on a communication period between the child station and the control station, which is performed in order to maintain a connection state between the child station and the control station in a power save mode, the decision of the communication period being performed in accordance with a predetermined wake-up period, a time-out value that maintains the connection state between the child station and the control station even when no communication is taking place, and a frame length that is a unit of the communication between the control station and the child station; and a transmission device adapted to transmit the communication period that is decided upon by the decision device to the control station, wherein the decision device decides on the time-out value to be the communication period when the wake-up period is greater than the time-out period, and decides on the wake-up period to be the communication period when the wake-up period is less than or equal to the time-out period.

According to still another aspect of the present invention, a control method of a child station of a communication system comprises a control station and a child station, the control method comprises the steps of:

deciding on a communication period between the child station and the control station, which is performed in order to maintain a connection state between the child station and the control station in a power save mode, the decision of the communication period being performed in accordance with a predetermined wake-up period, a time-out value that maintains the connection state between the child station and the control station even when no communication is taking place, and a frame length that is a unit of the communication between the control station and the child station; and transmitting the communication period that is decided upon in the decision step to the control station, wherein a decision is made in the decision step on the time-out value to be the communication period when the wake-up period is greater than the time-out period, and a decision is made in the decision step on the wake-up period to be the communication period when the wake-up period is less than or equal to the time-out period.

According to yet another aspect of the present invention, a storage medium adapted to storing a program for executing a control method of a child station of a communication system comprises a control station and a child station, wherein the program executes the control method on a computer, the control method comprises the steps of:

deciding on a communication period between the child station and the control station, which is performed in order to maintain a connection state between the child station and the control station in a power save mode, the decision of the communication period being performed in accordance with a predetermined wake-up period, a time-out value that maintains the connection state between the child station and the control station even when no communication is taking place, and a frame length that is a unit of the communication between the control station and the child station; and transmitting the communication period that is decided upon in the decision step to the control station, wherein the decision is made in the decision step on the time-out value to be the communication period when the wake-up period is greater than the time-out period, and a decision is made in the decision step on the wake-up period to be the communication period when the wake-up period is less than or equal to the time-out period.

Further features of the present invention will become apparent from the following description of exemplary embodiments (with reference to the attached drawings).

BRIEF DESCRIPTION OF THE DRAWINGS

FIG. 5 is a conceptual diagram that depicts a field configuration of a frame control field.

FIG. 13 is a conceptual diagram that depicts a format of a command block.

FIG. 19 is a flowchart that depicts a process sequence that is invoked when computing the CTA Rate Factor.

FIG. 24 depicts a relation between a frame type field value and a frame type.

FIG. 25 depicts a relation between an ACK policy field value and a type thereof.

FIG. 26 depicts a relation between a value of an element ID field and a type thereof.

FIG. 27 depicts a relation between a value of a command type field and a type thereof.

DESCRIPTION OF THE EMBODIMENTS

Following is a detailed description of embodiments according to the present invention, with reference to the attached drawings. It is to be understood that the configuration elements that are recited according to the embodiments are exemplary, and that the scope of the present invention is not restricted thereby.

First Embodiment

The description of the present embodiment is predicated on the IEEE Std. 802.15.3. A configuration of a communication apparatus and a communication system according to the embodiment will be described with reference to FIG. 1 and FIG. 2. It would be permissible to implement the communication apparatus with a single communication apparatus, as well as to implement the communication system in a manner that adds a plurality of functions as required.

Communication System

Figure 1:
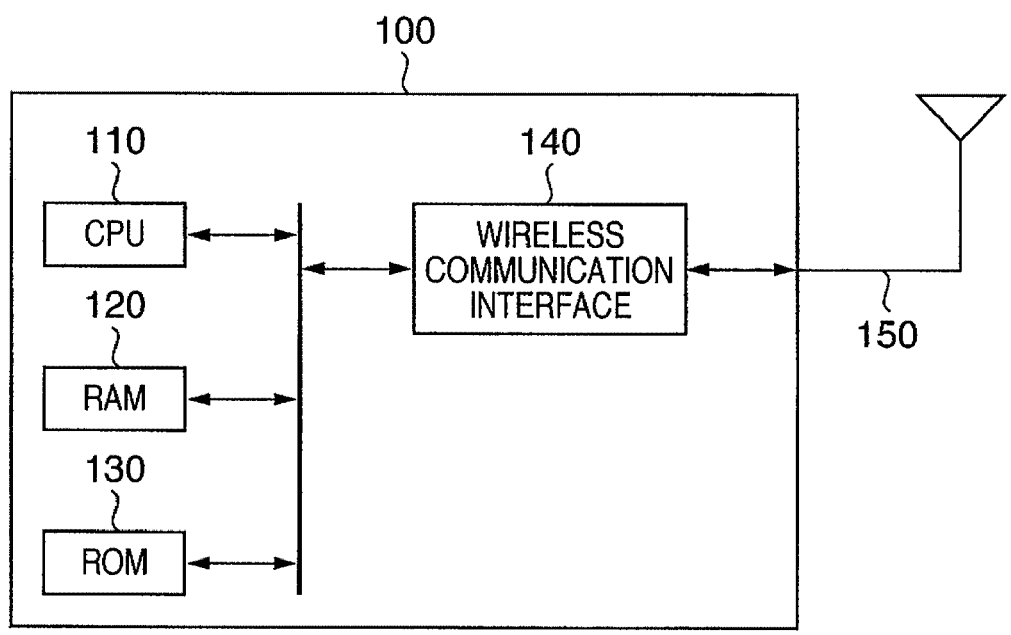
FIG. 1 is a block diagram that conceptually depicts a hardware configuration of a communication apparatus.

The description commences with the configuration of the communication apparatus according to the embodiment, with reference to FIG. 1. FIG. 1 is a block diagram that conceptually depicts a hardware configuration of the communication apparatus according to the embodiment. In FIG. 1, reference numeral 110 is a Central Processing Unit (CPU), which serves as a control unit that controls the communication apparatus overall. Reference numeral 120 is a Random Access Memory (RAM) that temporarily stores a program data that is supplied from such as an external apparatus. Reference numeral 130 is a Read Only Memory (ROM) that stores a program or a parameter that does not need to be changed. Reference numeral 140 is a wireless communication interface, that is, a sending and receiving unit, which implements a wireless communication function. Reference numeral 150 is an antenna that is used in the wireless communication interface 140. It would be permissible to implement the wireless communication apparatus in the preceding configuration, as well as in a form that adds a function of such as a storage apparatus or a display apparatus as necessary.

It would be possible to use software that implements a function that is equivalent to each respective preceding apparatus in place of a hardware apparatus to configure the present embodiment.

Whereas an example is depicted according to the embodiment wherein a program and an associated data according to the embodiment is loaded from the ROM 130 into the RAM 120 and executed thereby, the present is not restricted thereto. It would be permissible, for example, to load the program into the RAM 120 for each instance of running the program according to the embodiment from such as a hard drive apparatus or a memory apparatus whereon the program has been previously installed. It would also be possible to instead record the program according to the embodiment in the ROM 130, configure the location wherein the program according to the embodiment is stored to constitute a portion of a memory map, and directly execute the program according to the embodiment via the CPU 110.

Whereas the description according to the embodiment depicts a configuration that implements the communication apparatus according to the embodiment with a single apparatus for purposes of ease of description, it would be permissible to implement the communication apparatus according to the embodiment with a configuration that distributes a resource across a plurality of apparatuses. For example, it would be permissible to configure the communication apparatus according to the embodiment in a form that distributes storage or a computation resource across a plurality of apparatuses. It would also be permissible to instead distribute the resource based on each respective configuration element that is virtually implemented on the communication apparatus, and cause a parallel processing to be performed.

Figure 2:
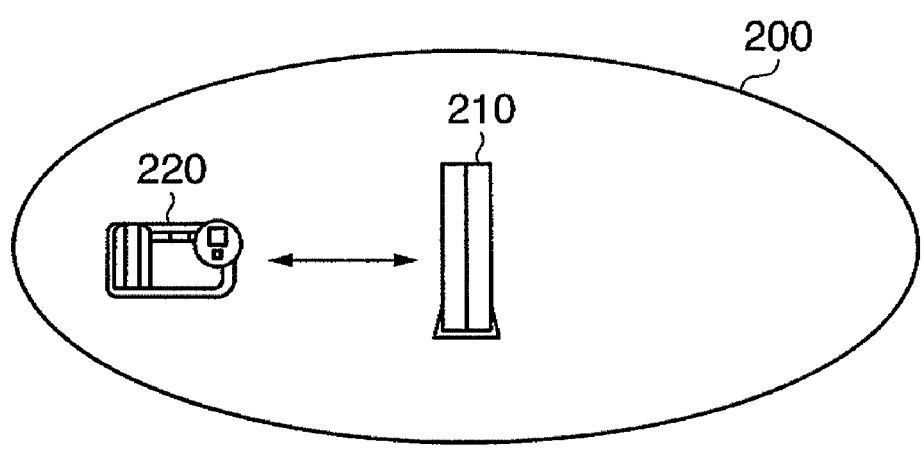
FIG. 2 conceptually depicts a configuration of a communication system.

Following is a description of a configuration of a communication system according to the embodiment, with reference to FIG. 2. FIG. 2 conceptually depicts a configuration of the communication system according to the embodiment. In FIG. 2, reference numeral 210 is a Piconet Coordinator (PNC), which possesses a function as a Piconet control station, that is, a control station terminal device. Reference numeral 220 is a device (DEV) that possesses a function as a child station terminal device. Reference numeral 200 is a Piconet that is configured from the PNC 210 and the DEV 220. The PNC 210 and the DEV 220 respectively comprise a hardware configuration that is depicted in an exemplary manner in FIG. 1. Whereas the PNC controls only one DEV, it would be permissible for a plurality of DEV to be present as necessary. The communication system according to the embodiment is implemented by forming the Piconet that is configured from the PNC and the DEV. The respective terminal devices perform a communication in accordance with Time Division Multiple Access (TDMA).

Frame Configuration

Figure 3:
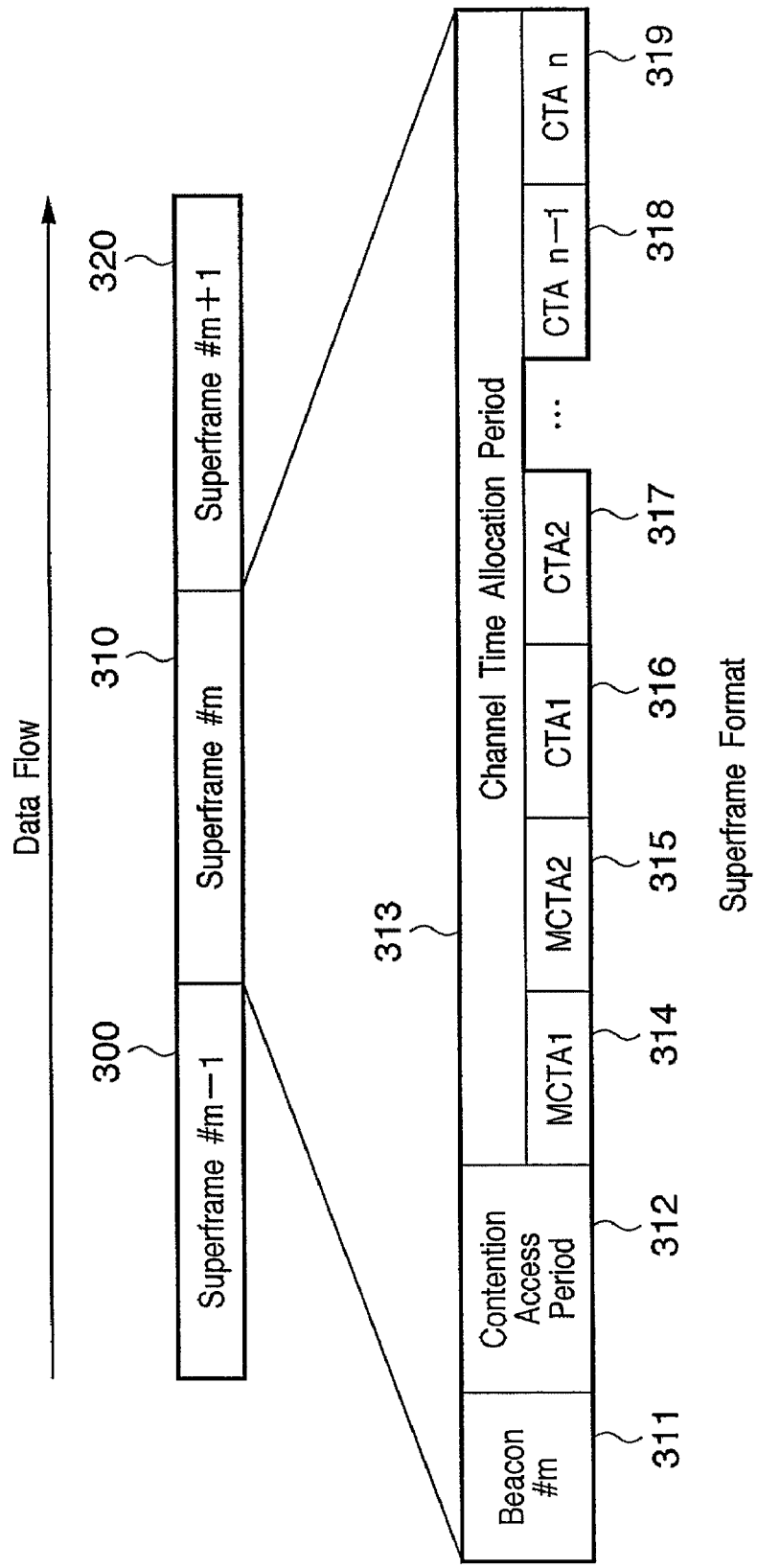
FIG. 3 conceptually depicts an IEEE Std. 802.15.3 specification frame configuration.

Following is a description of an IEEE Std. 802.15.3 frame configuration, with reference to FIG. 3. FIG. 3 conceptually depicts an IEEE Std. 802.15.3 frame configuration. Under the IEEE Std. 802.15.3, the PNC controls the DEV within the Piconet based on a frame unit known as a superframe. Each respective frame is configured from a Medium Access Controller (MAC) header and a MAC frame body, with a detailed description thereof to follow hereinafter.

In FIG. 3, reference numerals 300, 310, and 320 are superframes. Following is a description of the superframe 310. Reference numeral 311 is a beacon frame, reference numeral 312 is a CAP frame, and reference numeral 313 is a Channel Time Allocation Period (CTAP) frame. A description of the beacon frame 311 will follow hereinafter, with reference to FIG. 7. The CAP frame 312 employs a CSMA/CA protocol. The CAP frame 312 is optional, and may not be used, depending on the PNC. The CTAP frame 313 is configured of a CTA frame that is employed in a communication between the DEVs, and a Management Channel Time Allocation (MCTA) that is employed in a communication between the PNC and the DEV. It is possible for the PNC to arbitrarily allocate a number of the CTA frame and a number of the MCTA frame.

The MAC Header

Figure 4:
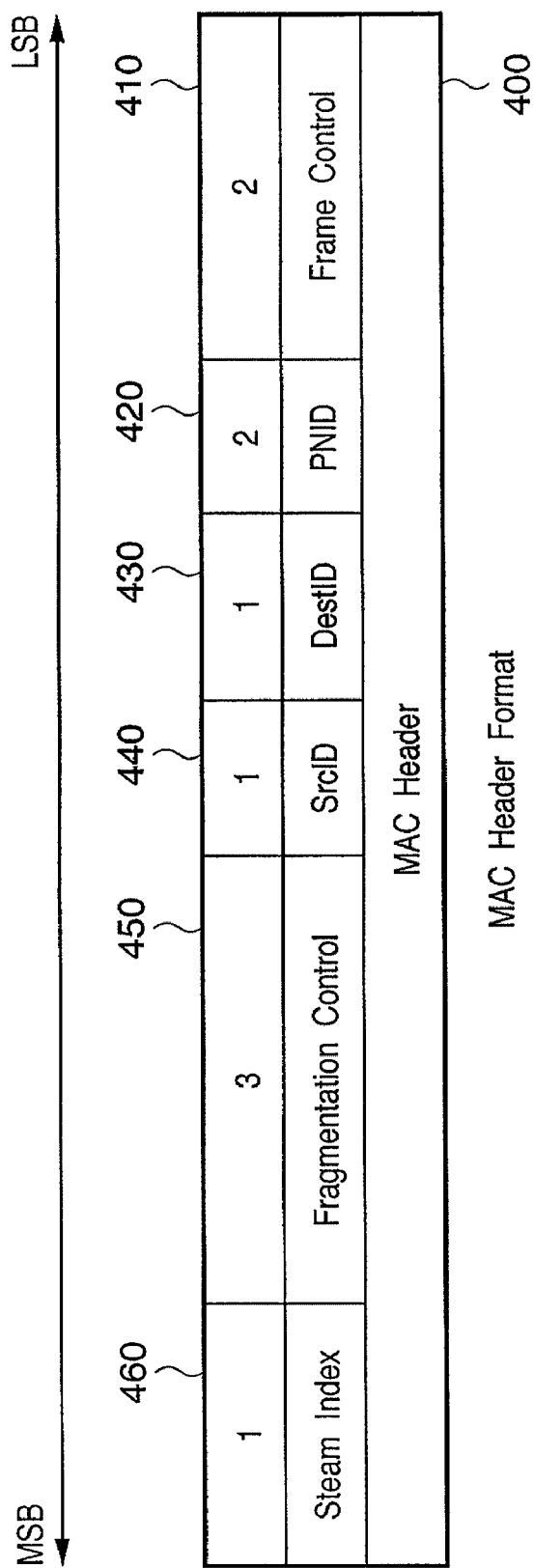
FIG. 4 is a conceptual diagram that depicts an MAC header configuration.

Following is description of the MAC header that configures the frame of the IEEE Std. 802.15.3, with reference to FIG. 4. FIG. 4 is a conceptual diagram that depicts the MAC header configuration.

In FIG. 4, a forefront of a data is at a right-hand end thereof. A description of another frame format under the IEEE 802.15.3 specification follows. Reference numeral 400 is the MAC header that denotes an information of the frame proper, and is configured of a following field. Reference numeral 410 is a frame control field that is configured of two octets, and which will be described hereinafter, with reference to FIG. 5. Reference numeral 420 is a PNID field that denotes a Piconet ID that is configured of two octets. Reference numeral 430 is a DestID field that denotes a communication destination of the frame, and that is configured of one octet. Reference numeral 440 is an SrcID field that denotes a communication source of the frame, and that is configured of one octet. Reference numeral 450 is a fragmentation control field, which is employed in controlling when the frame is segmented, and that is configured of three octets. Reference numeral 460 is a stream index field that is used in identifying such as a synchronous or an asynchronous data, and that is configured of one octet.

The Frame Control Field

Following is a detailed description of the frame control field 410 that is incorporated within the MAC header, with reference to FIG. 5. FIG. 5 is a conceptual diagram that depicts a field configuration of the frame control field.

In FIG. 5, reference numeral 501 is a protocol version field, which is configured of three bits. Reference numeral 502 is a frame type field, which is configured of three bits, and which describes whether the frame is a beacon frame or a data frame, etc. FIG. 24 depicts a relation between a value of the frame type field 502 and a frame type. Reference numeral 503 is an SEC, which is configured of one bit, and which must be set to "1" when the frame is secured, and which must be set to "0"

when the frame is non-secure. Reference numeral 504 is an Acknowledge (ACK) policy field, which is configured of two bits, and which defines a type of an ACK policy. FIG. 25 depicts a relation between a value of the ACK policy field and a type thereof. Reference numeral 505 is a retry bit, which is configured of one bit, and which must be set to "1" when the frame is being retried, and which must be set to "0" otherwise. Reference numeral 506 is a more data bit, which is configured of one bit, and which must be set to "1" when the frame is being extended, and which must be set to "0" either when the frame is not being extended or when a last frame is being extended. Reference numeral 507 is a reserved bit, which is configured of five bits.

MAC Frame Body

Figure 6:
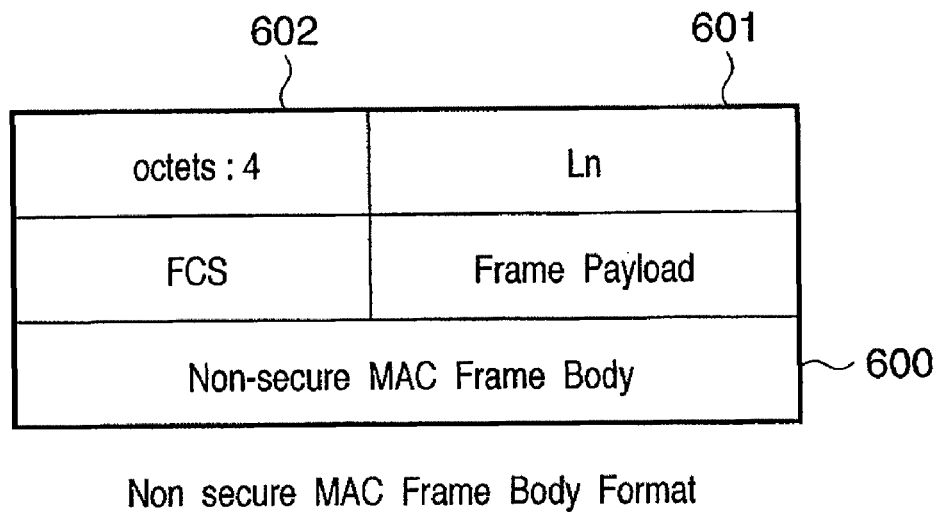
FIG. 6 is a conceptual diagram that depicts a configuration of an MAC frame body.

Following is a description of an MAC frame body that configures the IEEE Std. 802.15.3 frame, with reference to FIG. 6. FIG. 6 is a conceptual diagram that depicts a configuration of the MAC frame body.

Whether the MAC frame body is secure or not is defined by the SEC bit 503 that is within the MAC header 400. The following is a description employing a non-secure MAC frame body, in order to simplify the description according to the embodiment. Reference numeral 600 is the non-secure MAC frame body, which is configured of the following fields. Reference numeral 601 is a frame payload, which is a data component of the frame, the length whereof is Ln octets. Reference numeral 602 is a Frame Check Sequence (FCS) field, which is configured of four octets, and wherein is stored a Cyclic Redundancy Check (CRC) that corresponds with an ANSI Std. X3.66-1979.

Non-Secure Beacon Frame Body

Figure 7:
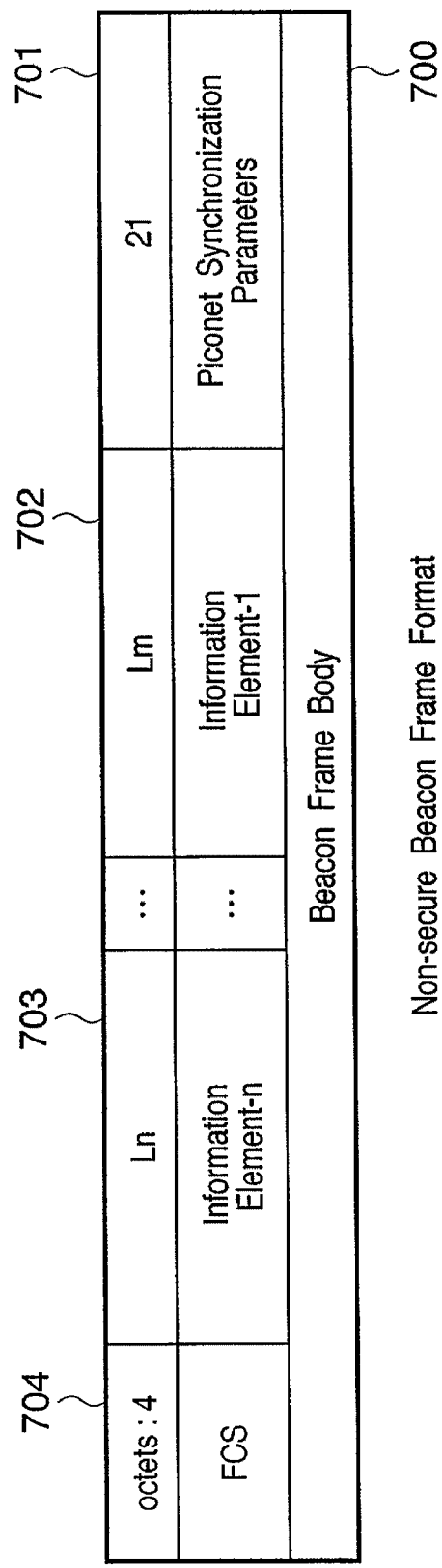
FIG. 7 is a conceptual diagram that depicts a format of a non-secure beacon frame body.

FIG. 7 is a conceptual diagram that depicts a format of a non-secure beacon frame body 700, which corresponds to FIG. 3, reference numeral 311. When the frame body is denoted by the MAC header 400 as being the beacon, the frame body is configured of each respective field of the reference numeral 700. Reference numeral 701 is a Piconet synchronization parameters field, to be described hereinafter with reference to FIG. 8. Reference numerals 702 through 703 are information element (IE) fields, to be described hereinafter with reference to FIG. 11. It is possible to possess an arbitrary number of the IE fields. Reference numeral 704 is the FCS field.

Piconet Synchronization Parameters Field

Figure 8:
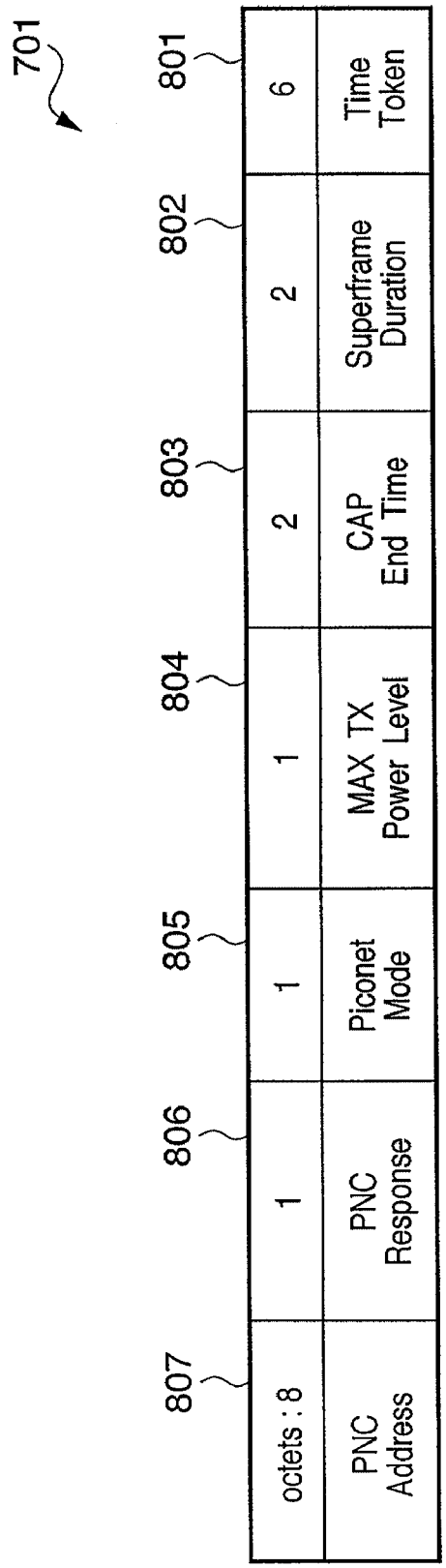
FIG. 8 is a conceptual diagram that depicts a configuration of a Piconet synchronization parameters field.

Following is a description of the Piconet synchronization parameters field 701 that is incorporated within the non-secure beacon frame body 700, with reference to FIG. 8. FIG. 8 is a conceptual diagram that depicts a configuration of the Piconet synchronization parameters field 701.

As per FIG. 8, the Piconet synchronization parameters field 701 is configured of the following fields. Reference numeral 801 is a time token field, which is configured of six octets, and which maintains a rollover counter value that is incremented on a per beacon basis. Reference numeral 802 is a superframe duration field, which is configured of two octets, and which denotes current superframe duration in units of one millisecond. Reference numeral 803 is a CAP end time field, which is configured of two octets, and which denotes a CAP end time with regard to the superframe. Reference numeral 804 is a maximum sending power level field, which is configured of one octet, and which denotes a maximum sending power level of a current superframe that is allowed by the PNC that is within the Piconet. Reference numeral 805 is a Piconet mode field, which is configured of one octet, and which will be described hereinafter, with reference to FIG. 9. Reference numeral 806 is a PNC response field, which is configured of one octet, and which will be described hereinafter, with reference to FIG. 10. Reference numeral 807 is a PNC address field, which is configured of eight octets, and which denotes a DEV address of the PNC.

The Piconet Mode Field

Figure 9:
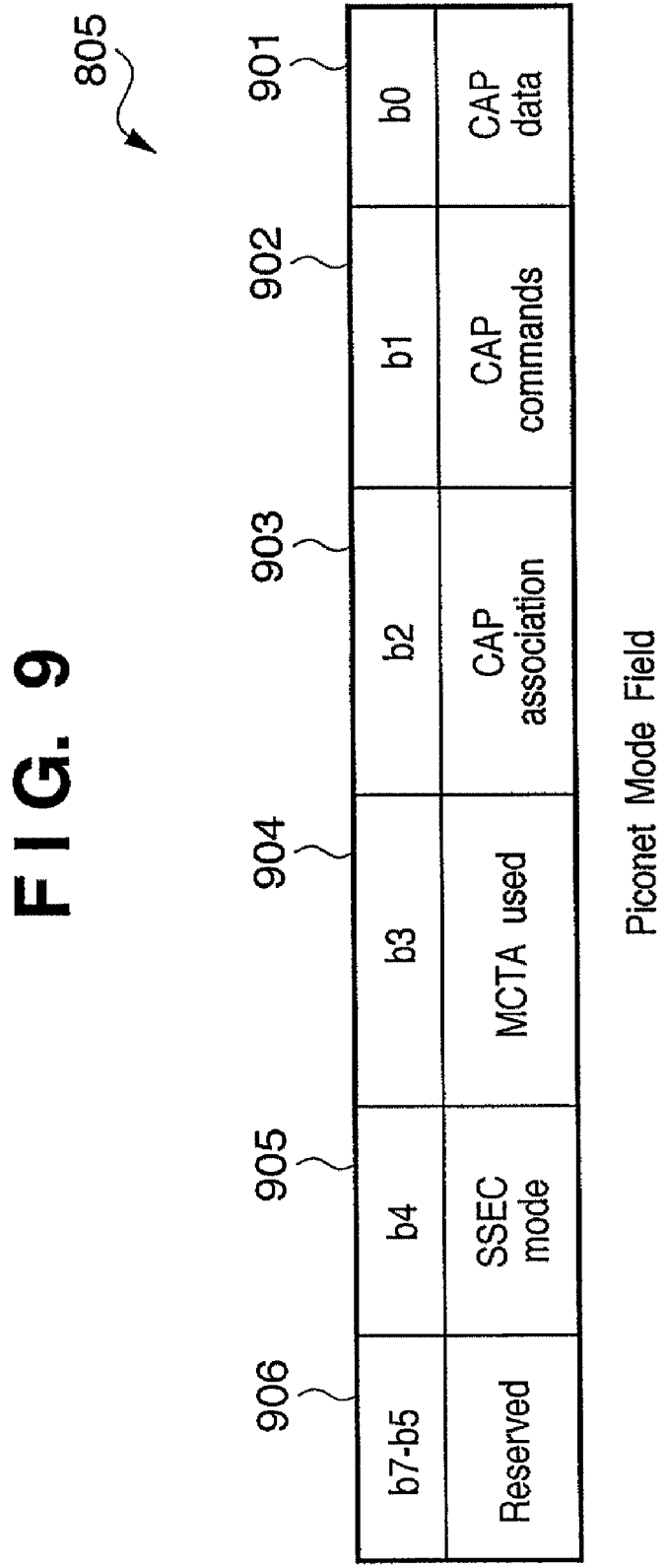
FIG. 9 is a conceptual diagram that depicts a format of a Piconet mode field.

Following is a description of the Piconet mode field 805 that is incorporated within the Piconet synchronization parameters field 701, with reference to FIG. 9. FIG. 9 is a conceptual diagram that depicts a format of the Piconet mode field 805.

Reference numeral 901 is a CAP data bit, which is configured of one bit, and which denotes whether or not it is possible to send data within the CAP duration that is within the current superframe. If a permission for the sending of the data is granted, the CAP data bit is set to "1." Reference numeral 902 is a CAP command bit, which is configured of one bit, and which denotes whether or not it is possible to send a command within the CAP duration that is within the current superframe. If a permission for a sending of a command other than a request for association is granted, the CAP command bit is set to "1." Reference numeral 903 is a CAP association command bit, which is configured of one bit, and which denotes whether or not it is possible to send an association command within the CAP duration that is within the current superframe. If the permission for the sending of the data is granted, the CAP association command bit is set to "1."

The PNC Response Field

Figure 10:
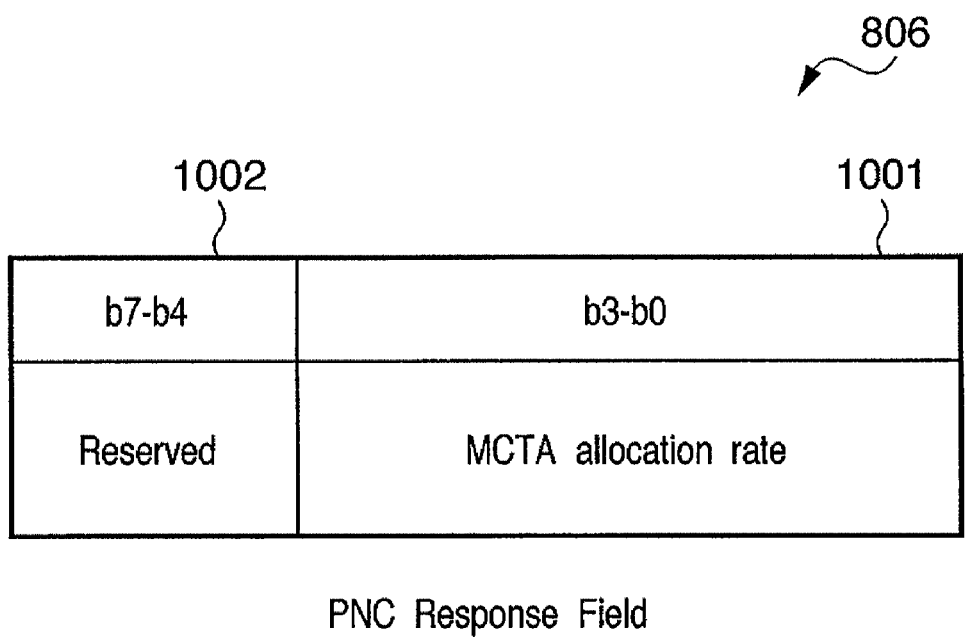
FIG. 10 is a conceptual diagram that depicts a field configuration of a PNC response field.

The following is a description of a field configuration of the PNC response field 806 that is incorporated within the Piconet synchronization parameters field 701, with reference to FIG. 10. FIG. 10 is a conceptual diagram that depicts the field configuration of the PNC response field 806.

Reference numeral 1001 is an MCTA allocation rate field, which is configured of four bits, and which denotes a frequency that the PNC assigns to an uplink MCTA either for an open MCTA or for each respective DEV. If the value thereof is "0," it denotes that the access to the PNC is used only during the CAP duration, and if the value is "15," it denotes that the PNC does not guarantee the MCTA assignment time. Reference numeral 1002 is a reserved field, which is configured of four bits.

IE Field

Figure 11:
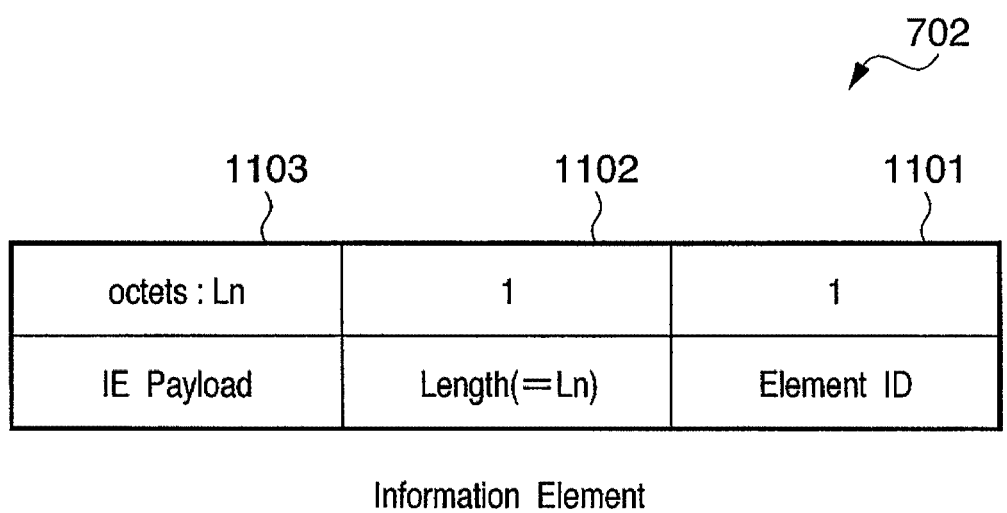
FIG. 11 is a conceptual diagram that depicts a format of an IE field.

The following is a description of the IE field 702 that is incorporated within the non-secure beacon frame body 700, with reference to FIG. 11. FIG. 11 is a conceptual diagram that depicts a format of the IE field 702.

Reference numeral 1001 is an element ID field, which is configured of one octet, and which denotes a type of the IE field. FIG. 26 depicts a relation between a value of the element ID field 1001 and the type thereof. Reference numeral 1102 is a length field, which is configured of one octet, and which denotes a length of the IE field. Reference numeral 1103 is an IE payload field, which is configured of an octet length that is denoted in the length field 1102, and which denotes a data of the IE field.

Command Format

The following is a description of a command format that is required when the DEV transitions to the APS mode, with regard to the IEEE Std. 802.15.3. It is possible for the command frame to implement the command format by setting the value of the frame control field 410 of the MAC header 400 to "011."

Figure 12:
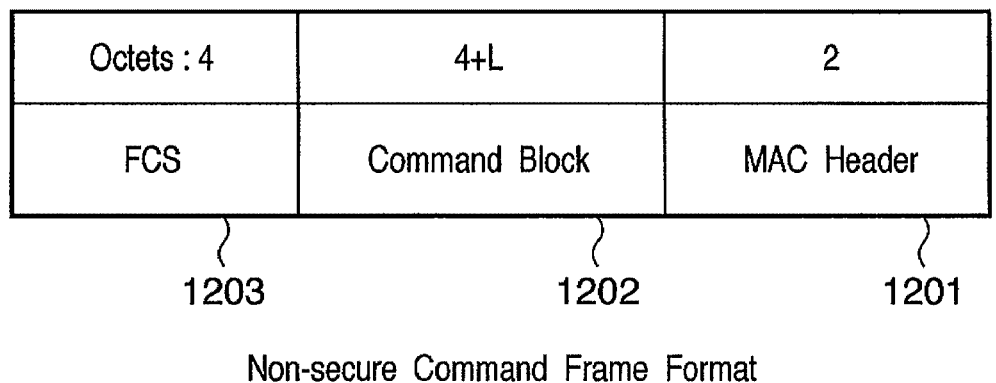
FIG. 12 is a conceptual diagram that depicts a format of a non-secure command frame.

FIG. 12 is a conceptual diagram that depicts a format of a non-secure command frame. Reference numeral 1201 is the MAC header, which is configured of two octets. Reference numeral 102 is a command block, which is configured of octets of a length 4+L, and which will be described in detail hereinafter, with reference to FIG. 13. Reference numeral 1203 is the FCS.

Command Block

The following is a description of the command block 1202 that is incorporated within the format of the non-secure command frame, with reference to FIG. 13. FIG. 13 is a conceptual diagram that depicts the format of the command block 1202.

In FIG. 13, reference numeral 1301 is a command type field, which is configured from two octets. FIG. 27 depicts a relation between a value of the command type field 1301 and a type thereof. Reference numeral 1302 is a length field, which is configured of two octets, and which represents a payload length of the command block. Reference numeral 1303 is a command payload field.

Association Operation

Figure 14:
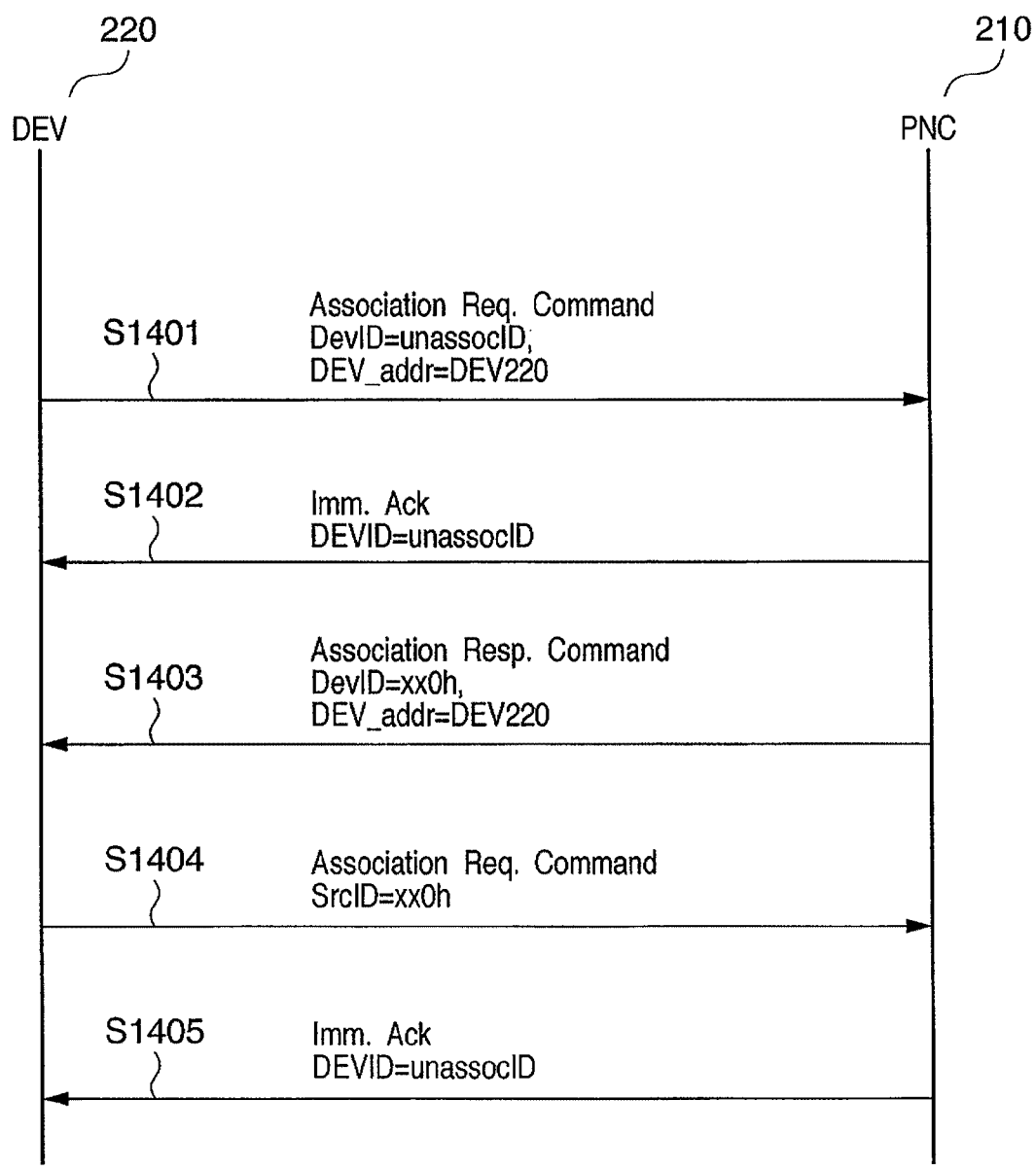
FIG. 14 is a message sequence chart that depicts a message sequence that is invoked when forming an association.

The following is a description of an operation when the DEV 220 associates with the PNC 210, with reference to FIG. 14. FIG. 14 is a message sequence chart (MSC) that depicts a message sequence that is invoked when forming the association between the DEV 220 and the PNC 210.

In step S1401, the DEV 220 sends an association request command to the PNC 210, setting a DEVID=unassocID and a DEVaddress=DEV220 therein. Upon receipt of the association request command in step S1401, the PNC 210 must verify that a resource that is adequate to support a new DEV is present, by referencing a list that the PNC 210 manages.

In step S1402, the PNC 210 sets and returns an Immediate (Imm) Ack to the DEVID=unassocID. If the PNC 210 determines that there is a sufficient resource for the DEV 220, then in step S1403, the PNC 210 sends an association response command, which means that it is possible to form the association, to the DEV 220. The PNC 210 sets and sends to the DEV 220 the association command to DEVID=xx (where "xx" is a two-digit hexadecimal number), DEVaddress=DEV220, and ReasonCode=Success. The Association Timeout Period (ATP) is sent simultaneously therewith. The ATP is a preset time-out value for maintaining the connection state between the PNC 210 and the DEV 220, even when no communication is taking place therebetween.

The sending by the PNC 210 of the association response command in step S1403 does not signify that the DEV 220 has been associated, and thus, the DEV 220 must send a next command frame within the ATP. Upon receipt of the association response command that possesses a DEV address that matches its own DEV address, the DEV 220 must perform a process in step S1404. In step S1404, the DEV 220 must send a second association request command, wherein a DEVID is set that is newly assigned to the SrcID field, within either the CAP or the association MCTA. Upon receipt of the second association request command in step S1404, the PNC 210 must initialize such as the DEVID and the DEV address of the DEV 220. In step S1405, the PNC 210 sends an Ack for the second association request command, and treats the DEV 220 as being associated with the PNC 210 upon receipt by the DEV 220 of the Ack thus sent.

Transitioning to the APS Mode

Figure 15:
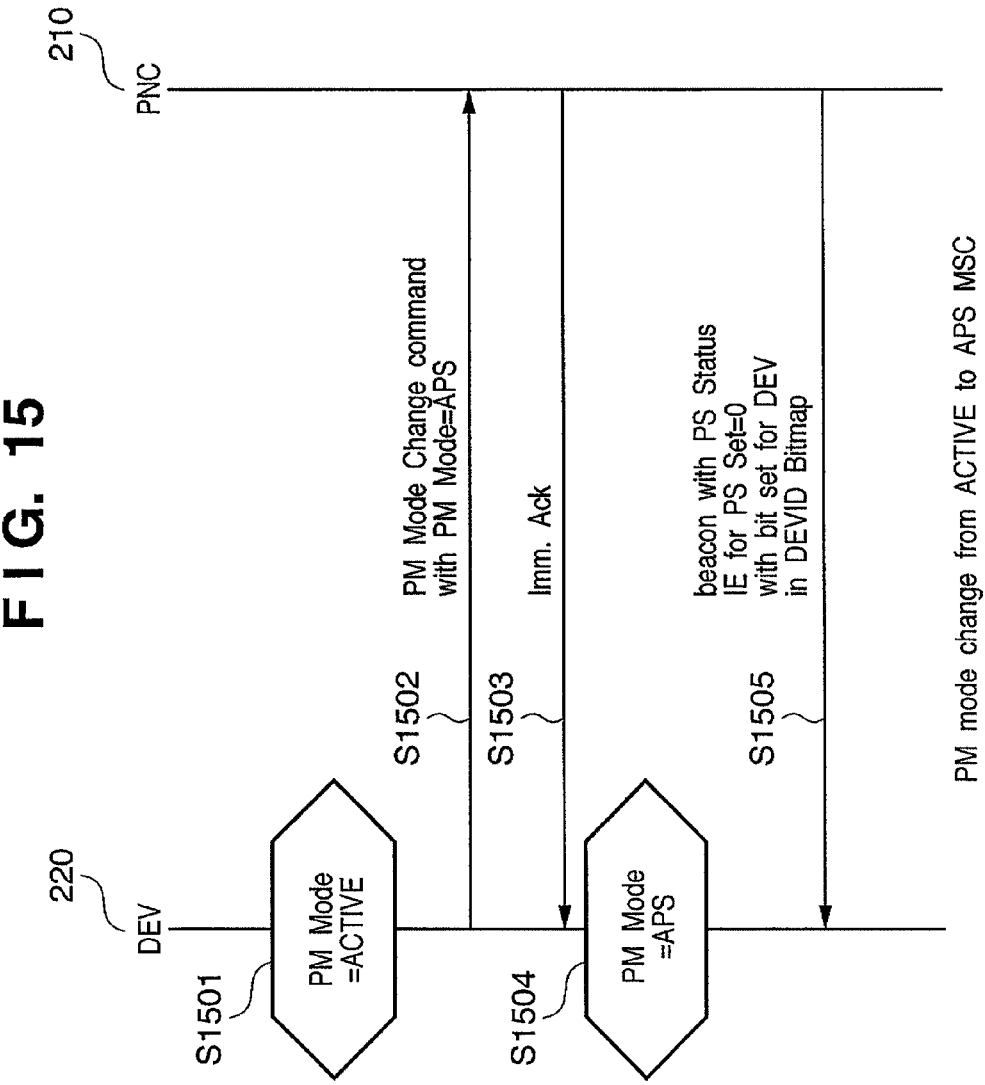
FIG. 15 is a message sequence chart that is invoked when a DEV transitions to an APS mode.

An operation when the DEV transitions transits to the Asynchronous Power Save (APS) mode is described hereinafter, with reference to FIG. 15. FIG. 15 is a message sequence chart (MSC) that is invoked when the DEV transitions to the APS mode.

It is presumed that the DEV 220 and the PNC 210 are associated and have formed the Piconet 200, as per the depiction in FIG. 14. If the Power Management (PM) mode of the DEV 220 is set to "ACTIVE" in step S1501, then in step S1502, the DEV 220 sends a PM mode change command to the PNC. When the Immediate (Imm) ACK is returned in step S1503, then in step S1504, the DEV 220 sets the PM mode to "APS." In step S1505, the transition to the APS mode is completed when the PNC 210 sends the beacon frame wherein the PSStatusIE PSSet=0.

Computation of CTA Rate Factor

Figure 16:
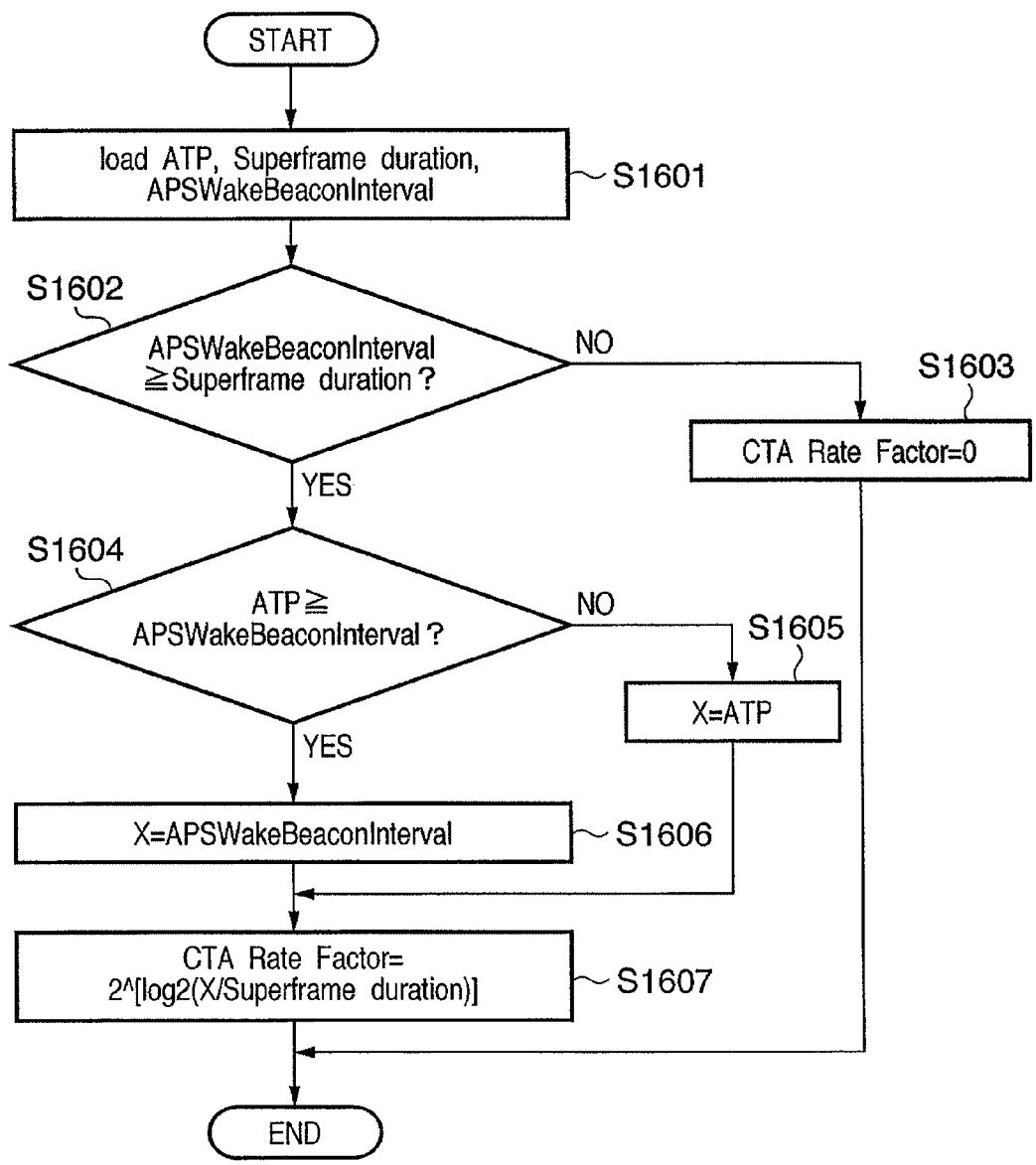
FIG. 16 is a flowchart that depicts a process sequence that is invoked when computing a CTA Rate Factor.

The following is a description of a sequence wherein the DEV 220, which is in the APS mode in FIG. 15, computes a CTA Rate Factor, with reference to FIG. 16. FIG. 16 is a flowchart that depicts the process sequence that is invoked when computing the CTA Rate Factor. The CTA Rate Factor is a value that denotes a period wherein the DEV 220 accesses the PNC 210, and represents the CTA interval on a superframe period unit basis. The period corresponds to a communication period between the DEV 220 and the PNC 210 that is performed in order to maintain the connection state between the DEV 220 and the PNC 210 with regard to the power save mode. For example, "CTARateFactor=2" denotes the CTA being allocated at intervals of two superframes, whereas "CTARateFactor=5" denotes the CTA being allocated at intervals of five superframes.

An exemplary description follows hereinafter of a circumstance wherein the CTA Rate Factor is a power of two, which is a default thereof, under the specification according to the embodiment. In step S1601, the DEV 220 loads a data as follows from the RAM 120, which serves as a temporary storage unit, into a register of the CPU 110:

the ATP that is obtained in step S1403;

the superframe duration that is obtained from the beacon frame in such as step S1505; and an APSWakeBeaconInterval, that is, a first period information, that denotes a wake-up period that is set within the DEV 220 proper and that the DEV requests.

In step S1602, the APSWakeBeaconInterval is compared with the superframe duration, and a determination is made as to whether or not the APSWakeBeaconInterval is greater than or equal to the superframe duration. If the APSWakeBeaconInterval is less than the superframe duration, that is, if step S1602 is "NO," the process proceeds to step S1603. If the APSWakeBeaconInterval is greater than or equal to the superframe duration, that is, if step S1602 is "YES," the process proceeds to step S1604.

In step S1603, the CTA Rate Factor is set to zero, i.e, "CTARateFactor=0." The process terminates thereupon.

In step S1604, on the other hand, the ATP is compared with the APSWakeBeaconInterval, and a determination is made as to whether or not the ATP is greater than or equal to the APSWakeBeaconInterval. If the value of the ATP is less than the APSWakeBeaconInterval, that is, if step S1604 is "NO," the process proceeds to step S1605. If the value of the ATP is greater than or equal to the APSWakeBeaconInterval, that is, if step S1604 is "YES," the process proceeds to step S1606.

In step S1605, the value of the ATP is written as a value of a register X of the CPU 110. The process thereby proceeds to step S1607.

In step S1606, on the other hand, the value of the APSWakeBeaconInterval is written as the value of the register X of the CPU 110. The process thereby proceeds to step S1607.

In step S1607, the value of the register X of the CPU 110 is divided by the superframe duration, and a base two logarithm derived from the quotient thereof, rounded down to the nearest integer. A power of an exponent is computed for the value thus obtained, with a minimum result of two, and the value thus obtained is treated as the CTA Rate Factor. The process terminates thereupon.

Setting of the CTA Rate Factor

Figure 17:
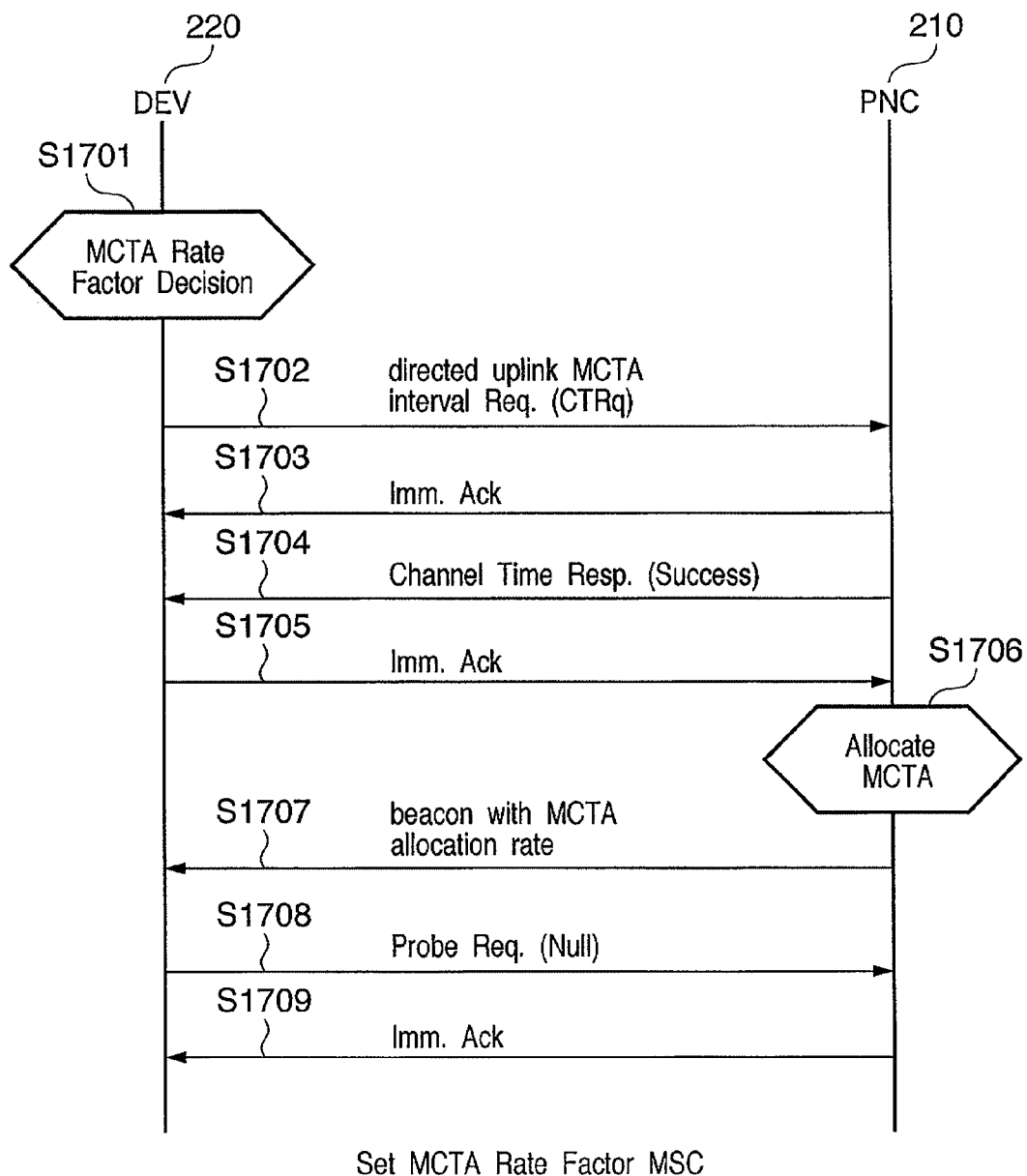
FIG. 17 is a message sequence chart wherein the DEV sets the CTA Rate Factor for the PNC.

The following is a description of a process of the DEV 220, which employed the sequence depicted in FIG. 16 to compute the CTA Rate Factor, setting the CTA Rate Factor to the PNC 210, with reference to FIG. 17. FIG. 17 is a message sequence chart (MSC) wherein the DEV 220 sets the CTA Rate Factor for the PNC 210. An exemplary description follows hereinafter of a circumstance wherein the DEV 220 employs the MCTA to access the PNC 210, according to the embodiment.

In step S1701, the DEV 220 decides on an MCTA Rate Factor. The process is performed in accordance with the flow that is depicted in the flowchart in FIG. 16, for example.

In step S1702, the DEV 220 transmits a channel interval request command and requests the MCTA interval for itself from the PNC 210, in order to send the CTA Rate Factor. Upon receipt thereof in step S1702, in step S1703, the PNC 210 returns the ImmAck to the DEV 220. If it is possible to accept the request in step S1702, in step S1704, the PNC 210 sends a ReasonCode of a Channel Time Response as a Success to the DEV 220.

Upon receipt from the PNC 210 of the Channel Time Response that has the Success ReasonCode, in step S1705, the DEV 220 returns the ImmAck to the PNC 210. Upon the receipt in step 1705, in step S1706, the PNC 210 allocates the MCTA in accordance with the CTA Rate Factor. The MCTA is allocated in a frame interval that is denoted by the CTA Rate Factor. The MCTA corresponds to a period for performing a communication when the DEV 220 is in the power save mode. For example, if "CTARateFactor=2," the MCTA is allocated at two frame intervals.

In step S1707, the PNC 210 sends a beacon frame, which contains an MCTA information that the DEV 220 can access, to the DEV 220. The MCTA information contains an information that denotes where among the frames the MCTA is allocated. Accordingly, the process corresponds to notifying the DEV 220 of the MCTA thus assigned. In step S1708, the DEV 220 sends a null probe request command in the present circumstance, in response to the receipt of the beacon frame. In step S1709, the communication state is maintained by the receipt of the ImmAck by the DEV 220 from the PNC 210.

Figure 18:
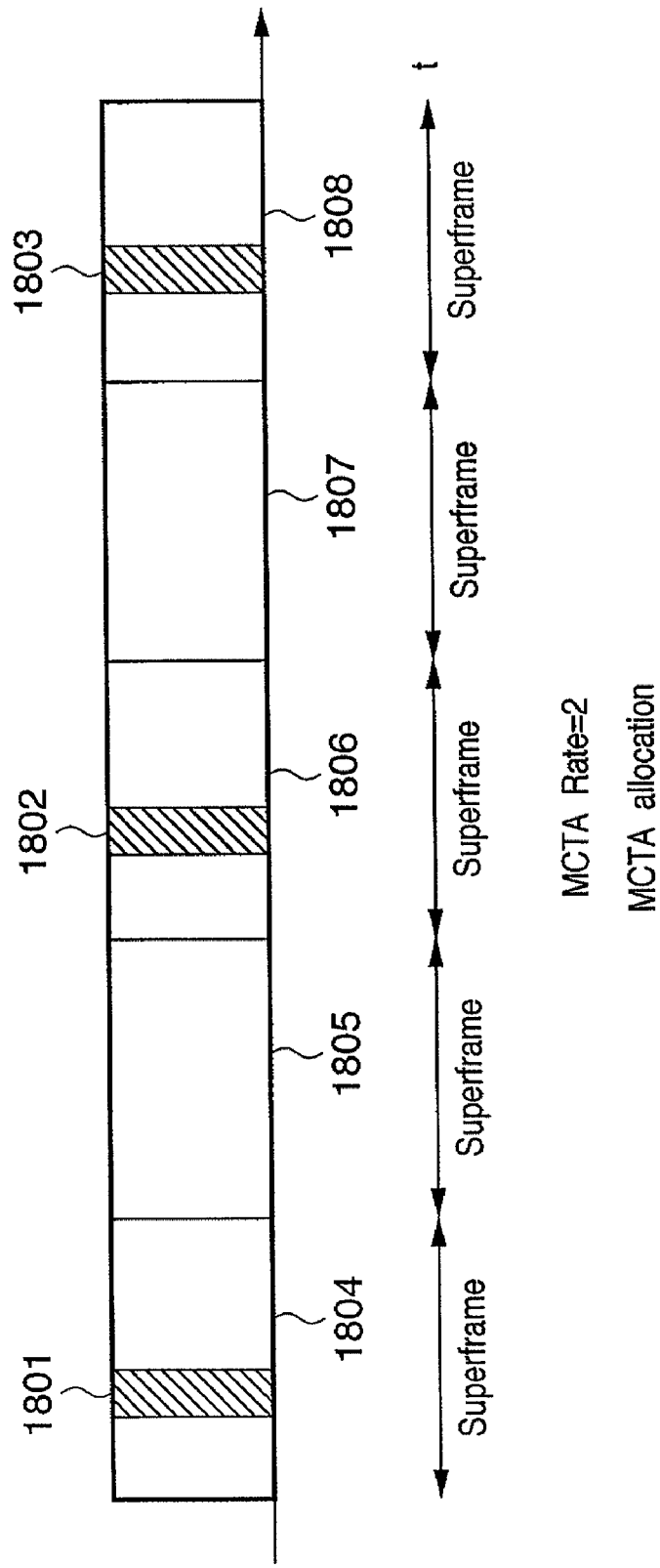
FIG. 18 is a conceptual diagram that depicts an example wherein an MCTA is allocated in accordance with the CTA Rate Factor.

FIG. 18 is a conceptual diagram that depicts an example wherein the MCTA is allocated in accordance with the CTA Rate Factor. Reference numerals 1801—1803 denote the MCTA, and reference numerals 1804—1808 denote the superframe. In the present circumstance, the "CTARateFactor=2," and the MCTA is accordingly allocated in every second superframe after the first superframe.

Per the foregoing, with regard to the configuration according to the embodiment, the DEV 220 computes the appropriate CTA Rate Factor and notifies the PNC 210 thereof, and the PNC 210 decides on the access timing in accordance with the CTA Rate Factor. The DEV 220 controls the communication so as to communicate with the PNC 210 on the access timing thus decided upon. Consequently, it is possible for the DEV 220 to communicate at a desired timing without communicating excessively, and to save on power consumption. It is also possible to improve the overall throughput of the communication system, because the PNC 210 does not set the access timing for the DEV 220 unnecessarily.

Whereas the MCTA is used for the timing allocation whereby the DEV accesses the PNC according to the embodiment, it is to be understood that it would be possible employ the CTA in place of the MCTA when using a PNC that possesses a DEV function.

Second Embodiment

A configuration of a communication apparatus and a communication system that are employed according to the embodiment are depicted in FIG. 1 and FIG. 2, respectively, as according to the first embodiment. The DEV 220 computes an arbitrary value as the CTA Rate Factor according to the embodiment.

Computing the CTA Rate Factor

Following is a description of a sequence of computing the CTA Rate Factor, with reference to FIG. 19. FIG. 19 is a flowchart that depicts the process sequence that is invoked when computing the CTA Rate Factor. It would be possible to apply a similar sequence when computing the MCTA Rate Factor as well.

The process sequence that is depicted in FIG. 19 is predicated upon the DEV 220 being in the APS mode, such as is depicted in FIG. 15. Steps S1601-S1606 are identical to the sequence that is depicted in FIG. 16 according to the first embodiment, and a description thereof will accordingly be omitted herein.

In FIG. 19, the sequence differs from the sequence depicted in FIG. 16 by proceeding to step S1901 when the process in step S1605 is completed, and when the process in step S1606 is completed. In step S1901, the value of the register X of the CPU 110 is divided by the superframe duration, and the result, rounded down, is treated as the CTA Rate Factor. The process terminates when the process in step S1901 is finished.

Setting the CTA Rate Factor

Figure 20:
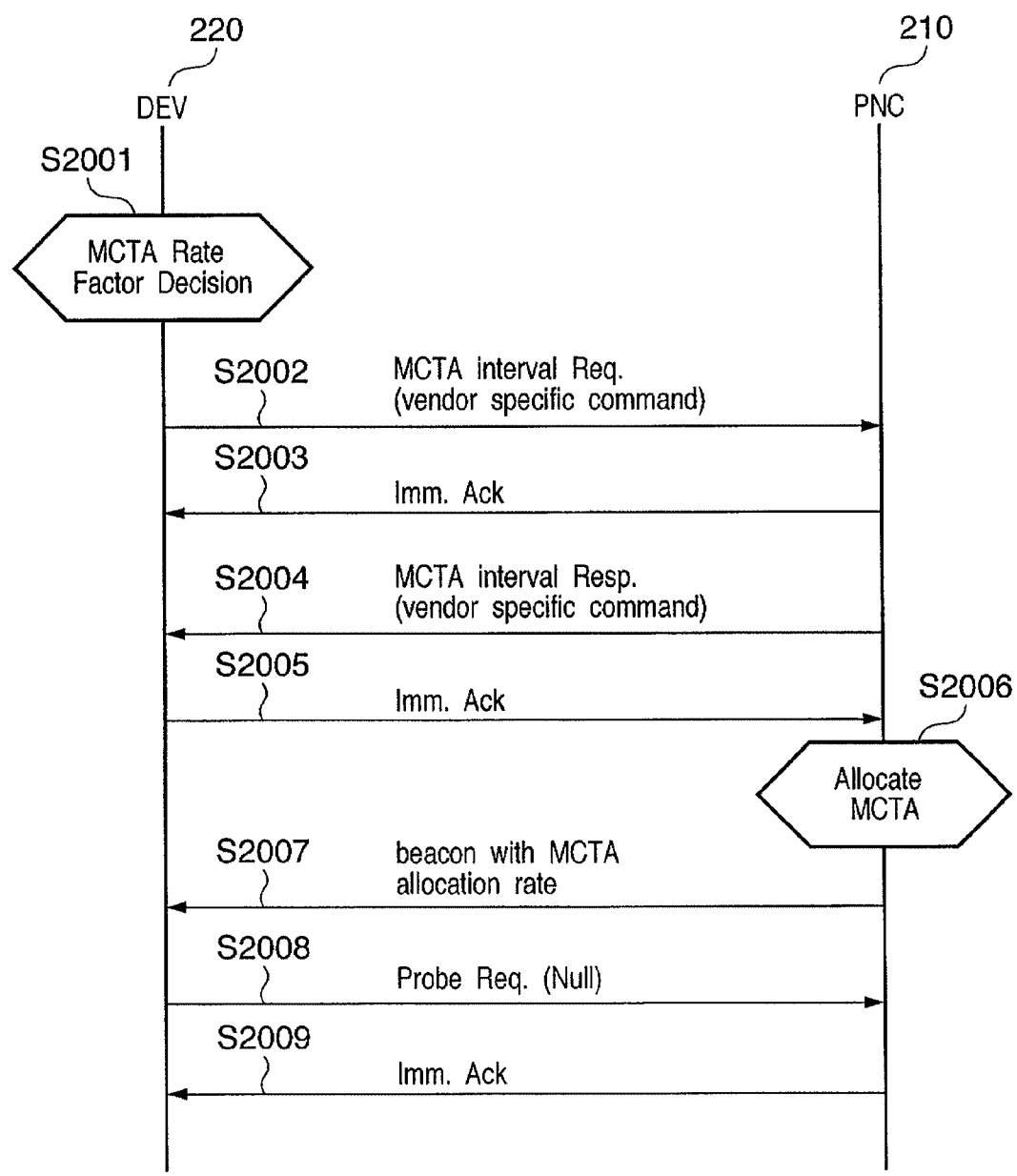
FIG. 20 is a message sequence chart wherein the DEV sets the CTA Rate Factor for the PNC.

FIG. 20 is a message sequence chart wherein the DEV sets the CTA Rate Factor for the PNC. FIG. 20 denotes the MSC wherein the DEV 220, which employed the sequence depicted in FIG. 19 to compute the CTA Rate Factor, sets the CTA Rate Factor for the PNC 210. The following is a description of a circumstance wherein the DEV 220 employs the MCTA to access the PNC 210, according to the embodiment.

In step S2001, the DEV 220 decides on the MCTA Rate Factor. The process depicted in step S2001 is performed in accordance with the sequence that is depicted in the flowchart in FIG. 19, for example. Upon determining the MCTA Rate Factor, in step S2002 the DEV 220 employs a vendor-specific request command to send the MCTA Rate Factor, and request an MCTA interval for itself.

Upon receipt of the request in step S2002, in step S2003 the PNC 210 returns the ImmAck. If it is possible to accept the request in step S2002, in step S2004, the PNC 210 employs a vendor-specific response command to send the ReasonCode of the channel time response as the Success to the DEV 220. In step S2005, the DEV 220 returns the ImmAck to the PNC 210 in response to the receipt of the channel time response.

Upon receipt of the ImmAck from the DEV 220 in step S2005, in step S2006 the PNC 210 allocates the MCTA according to the MCTA Rate Factor. In step S2007, the PNC 210 sends the beacon frame that contains the MCTA information that the DEV 220 is capable of accessing to the DEV 220.

In step S2008, the DEV 220 sends a null probe request command in the present circumstance to the PNC 210. In step S2009, the communication state is maintained upon the PNC 210 returning the ImmAck to the DEV 220.

Per the foregoing, with regard to the configuration according to the embodiment, it is possible for the DEV 220 to determine the appropriate value that is not restricted to a power of two, that is, an interval that is a multiple of a natural number of the frame interval, as the CTA Rate Factor.

Whereas the MCTA is used for the timing allocation whereby the DEV accesses the PNC according to the embodiment, it is to be understood that it would be possible employ the CTA in place of the MCTA when using a PNC that possesses a DEV function.

Third Embodiment

A configuration of a communication apparatus and a communication system that are employed according to the embodiment are depicted in FIG. 1 and FIG. 2, respectively, as according to the first embodiment and the second embodiment. If the DEV 220 employs an arbitrary value to set the CTA Rate Factor for the PNC 210, and is denied thereby by the PNC 210, the DEV 220 employs a power of two values to set the CTA Rate Factor for the PNC 210, according to the embodiment.

Figure 21:
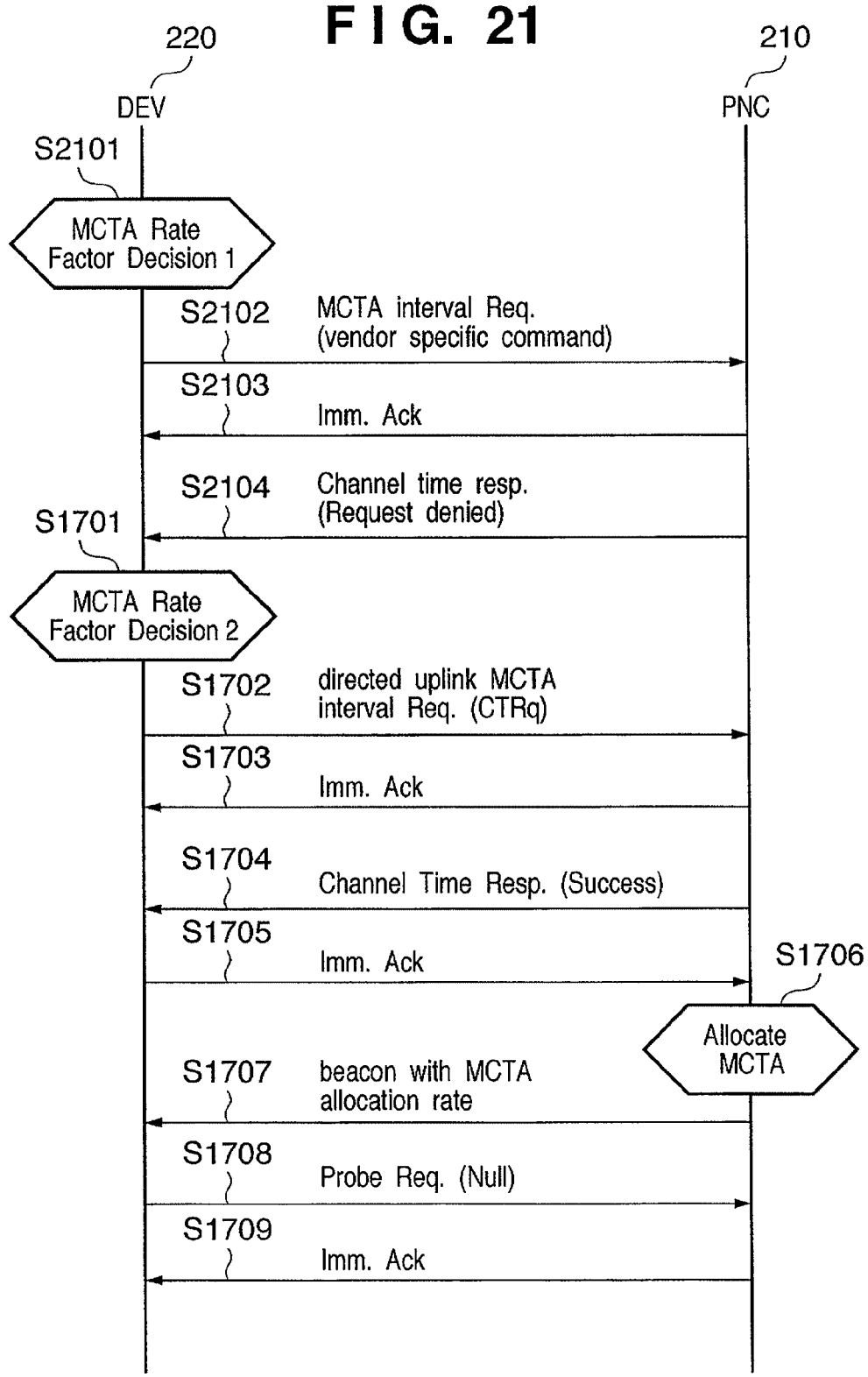
FIG. 21 is a message sequence chart wherein the DEV sets the CTA Rate Factor for the PNC.

The following is a description of a process sequence that the configuration according to the embodiment executes, with reference to FIG. 21. FIG. 21 is a message sequence chart wherein the DEV 220 sets the CTA Rate Factor for the PNC 210. An exemplary description follows hereinafter of a circumstance wherein the DEV 220 employs the MCTA to access the PNC 210, according to the embodiment.

The process sequence that is depicted in FIG. 21 is predicated upon the DEV 220 being in the APS mode, such as is depicted in FIG. 15. A sequence of computing a value wherein the CTA Rate Factor is not a power of two is performed in step S2101, and is as per the depiction in the flowchart in FIG. 19. In step S2102, the DEV 220 employs the vendor-specific request command to send the CTA Rate Factor, and request the MCTA interval for it.

Upon receipt of the request in step S2102, in step S2103 the PNC 210 returns the ImmAck. If the request in step S2102 cannot be accepted, in step S2104 the PNC 210 employs a vendor-specific response command to send the ReasonCode of the channel time response as a Failure to the DEV 220. Thereafter, the steps from step S1701 to step S1709 are similar to FIG. 17, and thus, a description thereof will be omitted herein.

Per the foregoing, with regard to the configuration according to the embodiment, upon receipt of the MCTA Rate Factor from the DEV 220, the PNC 210 determines whether or not to employ the value thus notified to assign the MCTA. If the PNC determines not to employ the MCTA Rate Factor, the PNC 210 sends a notification to the DEV 220 to the effect that the PNC 210 will not employ the MCTA Rate Factor. Upon receipt of the notification from the PNC 210 to the effect that the PNC 210 will not employ the MCTA Rate Factor, the DEV 220 determines an interval that is a multiple of a power of two of the superframe interval as the MCTA Rate Factor, and transmits the result to the PNC 210. It is thus possible to treat the MCTA interval as the multiple of a power of two of the superframe interval, with regard to the configuration according to the embodiment.

Whereas the MCTA is used for the timing allocation whereby the DEV accesses the PNC according to the embodiment, it is to be understood that it would be possible employ the CTA in place of the MCTA when using a PNC that possesses a DEV function.

Other Embodiments

Figure 22:
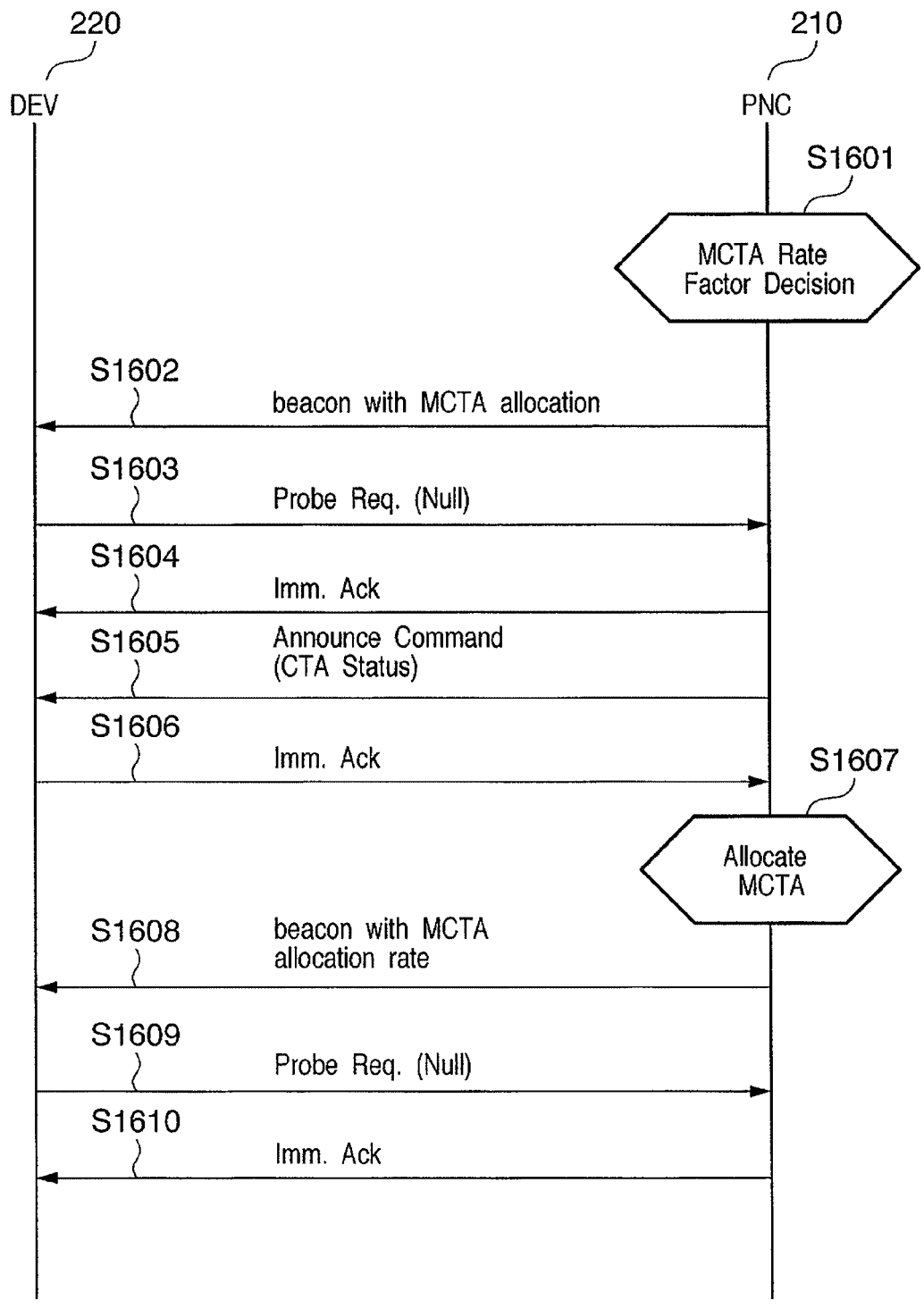
FIGS. 22 and 23 are message sequence charts wherein the CTA Rate Factor is set in a circumstance wherein an MCTA Rate Factor is decided on the PNC.
Figure 23:
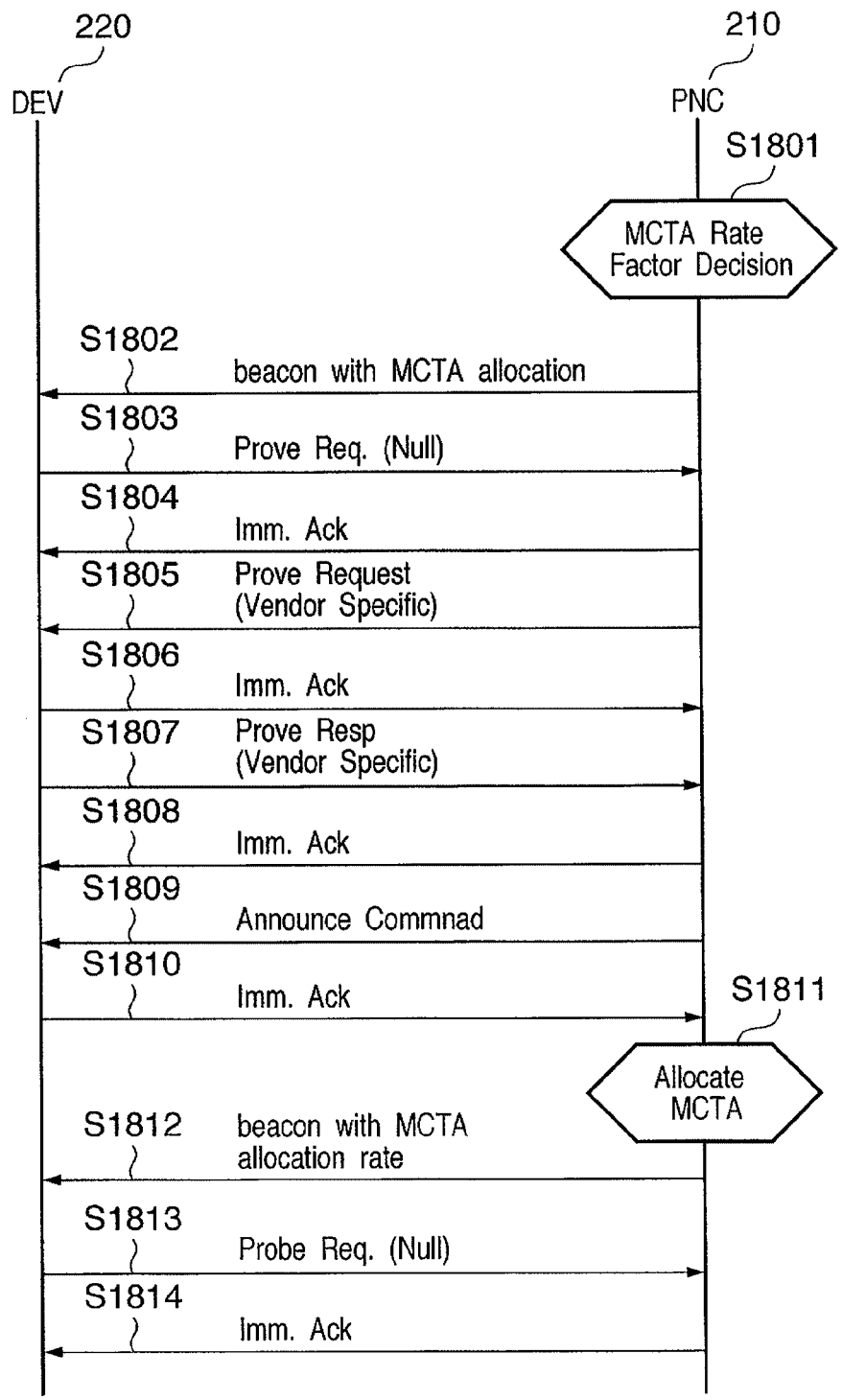

Whereas a configuration has been described that decides on the CTA Rate Factor on the DEV 220 according to the foregoing embodiments, it is to be understood that it would be permissible to decide on the CTA Rate Factor on the PNC 210, as depicted in FIGS. 22 and 23, according to an application or an objective thereof. FIGS. 22 and 23 are message sequence charts wherein the CTA Rate Factor is set in a circumstance wherein the MCTA Rate Factor is decided upon on the PNC 210.

Although an embodiment of the present invention has been described in detail above, it is possible for the invention to take on the form of a system, an apparatus, a program or storage medium. More specifically, the present invention may be applied to a system comprising a plurality of devices or to an apparatus comprising a single device.

It should be noted that there are cases where the object of the invention is attained also by supplying a program, which implements the functions of the foregoing embodiments, directly or remotely to a system or apparatus, reading the supplied program codes with a computer of the system or apparatus, and then executing the program codes.

Accordingly, since the functions of the present invention are implemented by computer, the program codes per se installed in the computer also fall within the technical scope of the present invention. In other words, the present invention also covers the computer program itself that is for the purpose of implementing the functions of the present invention.

In this case, so long as the system or apparatus has the functions of the program, the form of the program, for example, object code, a program executed by an interpreter or script data supplied to an operating system, etc., does not matter.

Examples of storage media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention or a compressed file that contains an automatic installation function can be downloaded to a recording medium such as a hard disk. Further, the program of the present invention can be supplied by dividing the program code constituting the program into a plurality of files and downloading the files from different websites. In other words, a WWW server that downloads, to multiple users, the program files that implement the functions of the present invention by computer also is covered by the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer. Further, besides the case where the aforesaid functions according to the embodiment are implemented by executing the read program by computer, an operating system or the like running on the computer may perform all or a part of the actual processing so that the functions of the foregoing embodiment can be implemented by this processing.

Furthermore, after the program read from the storage medium is written to a memory provided in a function expansion board inserted into the computer or a function expansion unit connected to the computer, a CPU or the like mounted on the function expansion board or function expansion unit performs all or a part of the actual processing so that the functions of the foregoing embodiment can be implemented by this processing.

According to the present invention, it is possible to implement a reduction in power consumption, together with an improvement in the overall throughput of the communication system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-017009, filed Jan. 26, 2007, which is hereby incorporated by reference herein in its entirety.

What is claimed is:

1. A communication system comprising a control station and a child station, the child station comprising:
a decision device adapted to decide a communication period between the child station and the control station, which is performed in order to maintain a connection state between the child station and the control station in a power save mode, the decision of the communication period being performed in accordance with a predetermined wake-up period, a time-out value that maintains the connection state between the child station and the control station even when no communication is taking place, and a frame length that is a unit of the communication between the control station and the child station; and
a transmission device adapted to transmit the communication period that is decided upon by the decision device to the control station;
wherein the decision device decides on the time-out value to be the communication period when the wake-up period is greater than the time-out period, and decides on the wake-up period to be the communication period when the wake-up period is less than or equal to the time-out period,
the control station comprising:
an assignment device adapted to assign an interval for communicating with the child station, in accordance with the communication period that is received from the child station; and
a notification device adapted to notify the child station of the interval that is assigned by the assignment device;
wherein the control station further comprises:
a determination device adapted to determine, when the communication period is received from the child station, whether or not the assignment device will employ the communication period thus received to assign the interval; and
a sending device adapted to send, when the determination device determines that the communication period thus received will not be employed, a notification to the child station that the communication period thus received therefrom will not be employed;
wherein
the decision device, upon being notified by the control station that the communication period will not be employed, decides anew that the communication period is a multiple of a power of two of the frame length; and
the transmission device transmits the communication period that has been decided anew by the decision device to the control station.

2. The communication system according to claim 1, wherein:
the control station and the child station perform a Time Division Multiple Access communication on a frame unit basis; and
the decision device decides on the communication period to be either a power of two, or a multiple of a natural number, of the frame length.

3. A child station of a communication system comprising a control station and a child station, the child station comprising:
a decision device adapted to decide on a communication period between the child station and the control station, which is performed in order to maintain a connection state between the child station and the control station in a power save mode, the decision of the communication period being performed in accordance with a predetermined wake-up period, a time-out value that maintains the connection state between the child station and the control station even when no communication is taking place, and a frame length that is a unit of the communication between the control station and the child station; and
a transmission device adapted to transmit the communication period that is decided upon by the decision device to the control station,
wherein the decision device decides on the time-out value to be the communication period when the wake-up period is greater than the time-out period, and decides on the wake-up period to be the communication period when the wake-up period is less than or equal to the time-out period; and
wherein
the decision device, upon being notified by the control station that the control station will not employ the communication period in order to assign the interval for communication between the control station and the child station, decides anew that the communication period is a multiple of a power of two of the frame length; and
the transmission device transmits the communication period that has been decided anew by the decision device to the control station.

4. The child station according to claim 3, wherein:
the control station and the child station perform a Time Division Multiple Access communication on a frame unit basis; and
the decision device decides on the communication period to be either a power of two, or a multiple of a natural number, of the frame length.

5. A control method of a child station of a communication system comprising a control station and a child station, the control method comprising the steps of:
deciding on a communication period between the child station and the control station, which is performed in order to maintain a connection state between the child station and the control station in a power save mode, the decision of the communication period being performed in accordance with a predetermined wake-up period, a time-out value that maintains the connection state between the child station and the control station even when no communication is taking place, and a frame length that is a unit of the communication between the control station and the child station; and
transmitting the communication period that is decided upon in the decision step to the control station,
wherein a decision is made in the decision step on the time-out value to be the communication period when the wake-up period is greater than the time-out period, and a decision is made in the decision step on the wake-up period to be the communication period when the wake-up period is less than or equal to the time-out period; and
wherein the decision step, upon being notified by the control station that the control station will not employ the communication period in order to assign the interval for communication between the control station and the child station, deciding anew that the communication period is a multiple of a power of two of the frame length; and the transmitting step transmitting the communication period that has been decided anew by the decision step to the control station.

6. A non-transitory storage medium adapted to storing a program for executing a control method of a child station of a communication system comprising a control station and a child station, wherein the program executes the control method on a computer, the control method comprising the steps of:

deciding on a communication period between the child station and the control station, which is performed in order to maintain a connection state between the child station and the control station in a power save mode, the decision of the communication period being performed in accordance with a predetermined wake-up period, a time-out value that maintains the connection state between the child station and the control station even when no communication is taking place, and a frame length that is a unit of the communication between the control station and the child station; and transmitting the communication period that is decided upon in the decision step to the control station, wherein the decision is made in the decision step on the time-out value to be the communication period when the wake-up period is greater than the time-out period, and a decision is made in the decision step on the wake-up period to be the communication period when the wake-up period is less than or equal to the time-out period; and wherein the decision step, upon being notified by the control station that the control station will not employ the communication period in order to assign the interval for communication between the control station and the child station, deciding anew that the communication period is a multiple of a power of two of the frame length; and the transmitting step transmitting the communication period that has been decided anew by the decision step to the control station.

\* \* \* \* \*